(12) United States Patent
Laroia et al.

(10) Patent No.: US 7,411,895 B2
(45) Date of Patent: Aug. 12, 2008

(54) CONTROLLED SUPERPOSITION CODING IN MULTI-USER COMMUNICATION SYSTEMS

(75) Inventors: Rajiv Laroia, Basking Ridge, NJ (US); Junyi Li, Bedminster, NJ (US); Murari Srinivasan, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 10/782,186

(22) Filed: Feb. 19, 2004

(65) Prior Publication Data

US 2004/0166869 A1 Aug. 26, 2004

Related U.S. Application Data

(63) Continuation-in-part of application No. 10/640,718, filed on Aug. 13, 2003.

(60) Provisional application No. 60/471,000, filed on May 16, 2003, provisional application No. 60/448,528, filed on Feb. 19, 2003.

(51) Int. Cl.
   *H04J 11/00* (2006.01)
(52) U.S. Cl. .................. 370/203; 370/211; 370/241; 370/465
(58) Field of Classification Search .......... 455/509, 455/450, 513, 522; 370/32, 342, 345, 224, 370/335
   See application file for complete search history.

(56) References Cited

U.S. PATENT DOCUMENTS

| 6,125,150 | A   |    | 9/2000  | Wesel et al.      |         |
|-----------|-----|----|---------|-------------------|---------|
| 6,259,685 | B1  | *  | 7/2001  | Rinne et al.      | 370/330 |
| 6,385,261 | B1  |    | 5/2002  | Tsuji et al.      |         |
| 6,473,624 | B1  | *  | 10/2002 | Corbett et al.    | 455/522 |
| 6,609,008 | B1  |    | 8/2003  | Whang et al.      |         |
| 6,694,147 | B1  |    | 2/2004  | Viswanath et al.  |         |
| 6,731,939 | B1  | *  | 5/2004  | Watanabe et al.   | 455/450 |
| 6,788,963 | B2  |    | 9/2004  | Laroia et al.     |         |

(Continued)

OTHER PUBLICATIONS

PCT International Search Report, for International Application No. PCT/US04/04947, Feb. 19, 2004.

(Continued)

*Primary Examiner*—William Trost
*Assistant Examiner*—Julio Perez
(74) *Attorney, Agent, or Firm*—David J. Huffaker; Milan I. Patel; Thomas R. Rouse

(57) ABSTRACT

Methods of using superposition coding in a communications systems, e.g., a multi-user communications system. Superpostion coding in accordance with the invention occurs in the case of an uplink by transmissions of different wireless terminals transmitting using the same communications resource, e.g., simultaneously transmitting using the same frequencies. The signals combine in the communications channel resulting in one transmission being superimposed on the other transmission. The device, e.g., base station, receiving the superimposed signals uses superposition decoding techniques to recover both signals. To obtain the benefit of the superposition, assignments of channel segments to multiple wireless terminals is controlled by the base station and/or transmission power levels are controlled by on or more wireless terminals sharing the same uplink communications resource, e.g., time slot, to make sure that the received signals from the different devices will have different received power levels making superposition decoding possible.

50 Claims, 14 Drawing Sheets

U.S. PATENT DOCUMENTS

| | | | |
|---|---|---|---|
| 6,801,759 B1* | 10/2004 | Saifuddin | 455/127.1 |
| 2003/0053524 A1* | 3/2003 | Dent | 375/148 |
| 2003/0153344 A1* | 8/2003 | Su et al. | 455/522 |
| 2004/0086027 A1* | 5/2004 | Shattil | 375/146 |
| 2004/0102202 A1 | 5/2004 | Kumaran et al. | |
| 2004/0205198 A1* | 10/2004 | Zellner et al. | 709/228 |

OTHER PUBLICATIONS

Cover, Thomas, *Broadcast Channels*, IEEE Transactions on Information Theory, IT-18(1):2:14, 1972.

International Preliminary Report on Patentability dated: Aug. 19, 2005 with Written Opinion of the International Searching Authority dated: Aug. 24, 2004 from International Application No. PCT/US2004/004947. pp. 1-6.

* cited by examiner

CONTROLLED SUPERPOSITION CODING IN MULTI-USER COMMUNICATION SYSTEMS

RELATED APPLICATIONS

This application claims the benefit of U.S. Provisional Application Ser. No. 60/448,528 filed on Feb. 19, 2003, titled "CONTROLLED SUPERPOSITION CODING IN MULTI-USER COMMUNICATION SYSTEMS"; claims the benefit of U.S. Provisional Application Ser. No. 60/471,000 filed on May 16, 2003, titled "METHODS AND APPARATUS OF ENHANCING SUPERPOSITION CODING IN MULTI-USER COMMUNICATION SYSTEMS"; and is a continuation-in-part of U.S. Utility application Ser. No. 10/640,718 filed on Aug. 13, 2003, titled "METHODS AND APPARATUS OF ENHANCED CODING IN MULTI-USER COMMUNICATION SYSTEMS".

FIELD OF THE INVENTION

The present invention is directed to improved methods of coding and transmitting in a wireless communications system, and more specifically to improved methods using controlled superposition coding suitable for use in, e.g., a multi-user communications system.

BACKGROUND

Superposition coding in communications systems shall be described. Multi-user communication systems involve several transmitters and receivers communicating with each other and may use one or more communications methods. In general, multi-user communication methods may be categorized into one of two scenarios:
  (a) A single transmitter communicating with several receivers, commonly referred to as a broadcast communications method, and
  (b) Several transmitters communicating to a common receiver, which is commonly referred to as a multiple-access communications method.

The broadcast communications method is commonly known in the communications and information theory literature as the 'broadcast channel'. The 'broadcast channel' refers to each of the physical communication channels between the transmitter and the multiple receivers as well as the communication resources used by the transmitter to communicate. Similarly, the multiple-access communications method is widely known as the 'multiple-access channel'. The 'multiple-access channel' refers to the physical communication channels between the multiple transmitters and the common receiver, along with the communication resources used by the transmitters. The broadcast communications method is frequently used to implement the downlink communication channel in a typical cellular wireless system while the uplink channel in such a system is commonly implemented using the multiple-access communications method.

The transmission resource in a multi-user communication system can generally be represented in time, frequency or code space. Information theory suggests that the capacity of the system can be increased over other communication techniques in both the broadcast scenario and the multiple-access scenario. In particular, by transmitting to multiple receivers simultaneously in the case of the broadcast communications method, or by allowing multiple transmitters to transmit simultaneously in the case of the multiple-access communications method, over the same transmission resource, the capacity of the system can be increased over other communication techniques. In the case of the broadcast communications method, the technique used to transmit simultaneously to multiple users over the same transmission resource is also known as 'superposition coding'.

The advantages of superposition coding will be apparent in view of the following discussion of transmission techniques for the broadcast communications method. Consider a single transmitter communicating with two receivers, whose channels can be described by ambient Gaussian noise levels of $N_1$ and $N_2$, with $N_1<N_2$, i.e., the first receiver operates over a stronger channel than the second receiver. Assume that the communication resources available to the transmitter are a total bandwidth of W, and a total power of P. The transmitter may employ several strategies to communicate with the receivers. FIG. 1 is a graph 100 plotting the achievable rates in a broadcast channel for a first and second user for three different transmission strategies. Vertical axis 102 represents the rate for the stronger receiver, while horizontal axis 104 represents the rate for the weaker receiver. Line 106 shows achievable rates for a time division multiplexing (TDM) strategy. Line 108 shows achievable rates for a frequency division multiplexing (FDM) strategy. Line 110 shows maximum capacity achievable rates.

First, consider the strategy where the transmitter multiplexes between the two receivers in time, allocating all its resources to one receiver at a time. If the fraction of time spent communicating with the first (stronger) receiver is denoted by $\alpha$, it may be shown that the achievable rates for the two users satisfy the following equations.

$$R_1 \leq \alpha W \log\left(1 + \frac{P}{N_1}\right),$$

$$R_2 \leq (1-\alpha) W \log\left(1 + \frac{P}{N_2}\right)$$

As the fraction of time spent serving the first user, $\alpha$, varies, the rates achieved by the above equations are represented with the straight solid line 106 corresponding to 'TDM' as shown in FIG. 1.

Now consider a different transmission strategy where the transmitter allocates a certain fraction of the bandwidth, $\beta$, and a fraction of the available power, $\gamma$, to the first user. The second user gets the remaining fractions of bandwidth and power. Having allocated these fractions, the transmitter communicates with the two receivers simultaneously. Under this transmission strategy, the rate region can be characterized by the following equations.

$$R_1 \leq \beta W \log\left(1 + \frac{\alpha P}{N_1}\right),$$

$$R_2 \leq (1-\beta) W \log\left(1 + \frac{(1-\alpha)P}{N_2}\right).$$

The rates achieved by the above equations are visualized intuitively from the convex dashed curve line 108 corresponding to 'FDM' as shown in FIG. 1. It is evident that the strategy of dividing the available power and bandwidth between the two users in an appropriate manner outperforms the time-division partition of resources. However, the second strategy, is not yet the optimal one.

The supremum of the rate regions achievable under all transmission strategies is the broadcast capacity region. For the Gaussian case, this region is characterized by the equations $$R_1 \le W\log\left(1 + \frac{\alpha P}{N_1}\right),$$

$$R_2 \le W\log\left(1 + \frac{(1-\alpha)P}{\alpha P + N_2}\right),$$

and is indicated by the dash/dot curve line 110 corresponding to 'CAPACITY' as shown in FIG. 1.

It was shown by Thomas Cover in T.M. Cover, *Broadcast Channels*, IEEE Transactions on Information Theory, IT-18 (1): Feb. 14, 1972, that a communication technique called superposition coding could achieve this capacity region. In this technique, the signals to different users are transmitted with different powers in the same transmission resource and superposed on each other. The gains achievable through superposition coding surpass any other communication technique that requires splitting of the transmission resource among different users.

The basic concept of superposition coding is illustrated in FIG. 2. FIG. 2 is a graph 200 illustrating a high power QPSK signal and a low power QPSK signal superposed on the high power QPSK signal. Vertical axis 202 represents Q-component signal strength while horizontal axis 204 represents P-component signal strength. While the example of FIG. 2 assumes QPSK modulation, the choice of modulation sets is not restrictive, and, in general, other modulation sets may be alternatively used. Also, the example FIG. 2 is sketched out for an exemplary case of two users, while the concept may be generalized and applied in a straightforward manner to multiple users. Assume that the transmitter has a total transmit power budget P. Suppose that the first receiver, referred to as 'weaker receiver', sees larger channel noise and the second receiver, referred to as 'stronger receiver', sees smaller channel noise. Four circles 206, filled in with a pattern, represent the QPSK constellation points to be transmitted at high power (better protected), $(1-\alpha)P$, to the weaker receiver. Meanwhile, additional information is conveyed to the stronger receiver at low power (less protected), $\alpha P$, also using a QPSK constellation. In FIG. 2, arrow 208 of magnitude $\sqrt{((1-\alpha)P)}$ provides an indication of the high transmission power, while arrow 210 $\sqrt{(\alpha P)}$ provides an indication of the low transmission power. The actually transmitted symbols, which combine both the high power and low power signals, are represented as blank circles 212 in the figure. A key concept that this illustration conveys is that the transmitter communicates to both users simultaneously using the same transmission resource.

The receiver strategy is straightforward. The weaker receiver sees the high power QPSK constellation with a low-power signal superposed on it. The SNR experienced by the weaker receiver may be insufficient to resolve the low-power signal, so the low power signal appears as noise and slightly degrades the SNR when the weaker receiver decodes the high power signal. On the other hand, the SNR experienced by the stronger receiver is sufficient to resolve both the high power and low power QPSK constellation points. The stronger receiver's strategy is to decode the high-power points (which are intended for the weaker receiver) first, remove their contribution from the composite signal, and then decode the low-power signal.

Based upon the above discussion, it should be appreciated that there is a need for variations and/or adaptations of the superposition coding concept which could be used to more effectively utilize air link resources in broadcast and/or multiple-access communications systems. In a wireless communications system, with multiple users, at any given time, different channel qualities will exist for the various users. Methods and apparatus that characterize the different receivers and transmitters as weaker/stronger on a relative basis with respect to one another and allow for these relative classifications to change over time may also be useful. Methods and apparatus of scheduling and power control that opportunistically utilize these differences and apply superposition coding methods could increase system capacity. New implementations using superposition coding methods may need methods to convey information between transmitters(s) and receiver(s) concerning the superposition coding, e.g., such as the temporary weaker/stronger assignment information. Methods of communicating such information that minimize overhead, where possible, and/or combine or link temporary assignment designations between multiple communication channel segments, e.g., an assignment channel segment and a traffic channel segment, would be advantageous.

SUMMARY

The present invention is directed to new and novel methods of using superposition coding in a communications systems, e.g., a multi-user communications system. Superposition coding occurs in a downlink and/or an uplink. Superposition coding in accordance with the invention occurs in the case of the downlink by transmissions to different wireless terminals from a base station using the same communications resource, e.g., simultaneously with the same frequencies. Superposition coding in accordance with the invention occurs in the case of the uplink by transmissions from different wireless terminals to a base station using the same communications resource. In the uplink case, the signals combine in the communications channel resulting in one transmission being superimposed on the other transmission. The device, e.g., base station, receiving the superimposed signals uses superposition decoding techniques to recover both signals. To obtain the benefit of the superposition, assignments of channel segments to multiple wireless terminals is controlled by the base station. Moreover, in the downlink case, the transmission power levels are controlled by the base station so that the received power levels are very different to facilitate superposition decoding. In the uplink case, the transmission power levels are controlled by the wireless terminals sharing the same uplink communications resource, e.g., time slot and frequency, to make sure that the received signals from the different devices at the base station will have different received power levels facilitating superposition decoding.

In various embodiments of the present invention, the base station maintains information regarding the quality of the communications channels between individual wireless terminals and the base station. A communications channel segment is assigned to two or more wireless terminals having at least a minimum difference, e.g., a 3, 5 or 10 dB difference, in the quality of their communications channels from the base station in the downlink case or communications channels to the base station in the uplink case. Channel assignments are transmitted to wireless terminals which are to share a traffic channel segment. The assignment conveys which wireless terminals are to simultaneously use a communications channel segment and, in addition, which of the assigned devices is to transmit (in the uplink case) or receive (in the downlink case) the strong or weak signal. Assignment messages may be transmitted as superimposed signals.

For the sake of simplifying the description, this document assumes that two signals are superimposed to form a superposition coding signal. However, more than two signals can be superimposed. The invention is applicable to the cases where more than two signals are superimposed to form a superposition coding signal.

Hence, the two signals of a superposition coding signal are respectively called the strong signal and the weak signal, where the strong signal is the one with high received power and the weak signal is the one with low received power. When two wireless terminals share the same communications resource, the one with better channel condition is called the stronger user and the one with worse channel condition is called the weaker user. In some embodiments, a given wireless terminal may be the strong user when it shares the resource with another wireless terminal, and be the weaker user when it shares the resource with a third wireless terminal.

In many uplink cases, the stronger user will be assigned to operate transmitting the signal which will be received by the base station as the strong signal and the weaker user will normally be assigned to operate transmitting the signal which will be received by the base station as the weak signal. This avoids generating excessive interference to other base stations or requiring excessive peak transmission power from the wireless terminal. In those cases, the stronger user is also called stronger transmitter and the weaker user is also called weaker transmitter.

In many downlink cases, the stronger user will be assigned to operate receiving the weak signal and the weaker user will normally be assigned to operate receiving the strong signal. This helps to improve the link reliability of the weaker user while not wasting power to the stronger user. In those cases, the stronger user is also called stronger receiver and the weaker user is also called weaker receiver.

Channel assignments transmitted to wireless terminals which are to share a traffic channel segment may also be made using superposition coding. Note that channel assignments are generally made by the base station and transmitted in the downlink. Thus, the assignment sent to the stronger user is transmitted with the weak signal and the assignment sent to the weaker user is transmitted with the strong signal. Hence, if a wireless terminal realizes that the assignment for it comes from the strong signal, e.g., its terminal identifier is transmitted by the strong signal, the wireless terminal knows that it is considered by the base station as the weaker user, i.e., the weaker transmitter in the case where the wireless terminal is assigned an uplink traffic channel or the weaker receiver in the case where the wireless terminal is assigned a downlink traffic channel. Similarly, if a wireless terminal realizes that the assignment for it comes from the weak signal, the wireless terminal knows that it is considered by the base station as the stronger user, i.e., the stronger transmitter where the wireless terminal is assigned an uplink traffic channel or the stronger receiver where the wireless terminal is assigned a downlink traffic channel.

In accordance with the present invention, superposition coding can be used in an opportunistic manner. That is, superposition coding may be used when wireless terminals with sufficiently different channel conditions are available to be paired to share a communications channel segment. In cases where a sufficient difference in received power levels may not be achieved, e.g., due to an insufficient different in channel conditions between devices or insufficient transmission power capabilities, wireless terminals are not scheduled to share a transmission segment. Thus, superposition is used in transmission slots where it is likely to produce reliable results due to sufficient received power level differences but not in cases here it is likely to be unreliable.

Numerous additional features, benefits and advantages of the present invention will be apparent in view of the detailed description which follows.

DETAILED DESCRIPTION

As discussed above, the present invention is directed to new and novel methods of using superposition coding in a communications systems, e.g., a multi-user communications system. Superposition coding occurs in a downlink and/or an uplink. Superposition coding in accordance with the invention occurs in the case of the downlink by transmissions to different wireless terminals from a base station using the same communications resource, e.g., simultaneously with the same frequencies. Superposition coding in accordance with the invention occurs in the case of the uplink by transmissions from different wireless terminals to a base station using the same communications resource. In the uplink case, the signals combine in the communications channel resulting in one transmission being superimposed on the other transmission. The device, e.g., base station, receiving the superimposed signals uses superposition decoding techniques to recover both signals. To obtain the benefit of the superposition, assignments of channel segments to multiple wireless terminals is controlled by the base station. Moreover, in the downlink case, the transmission power levels are controlled by the base station so that the received power levels are very different to facilitate superposition decoding. In the uplink case, the transmission power levels are controlled by the wireless terminals sharing the same uplink communications resource, e.g., time slot, to make sure that the received signals from the different devices at the base station will have different received power levels facilitating superposition decoding.

Figure 1:
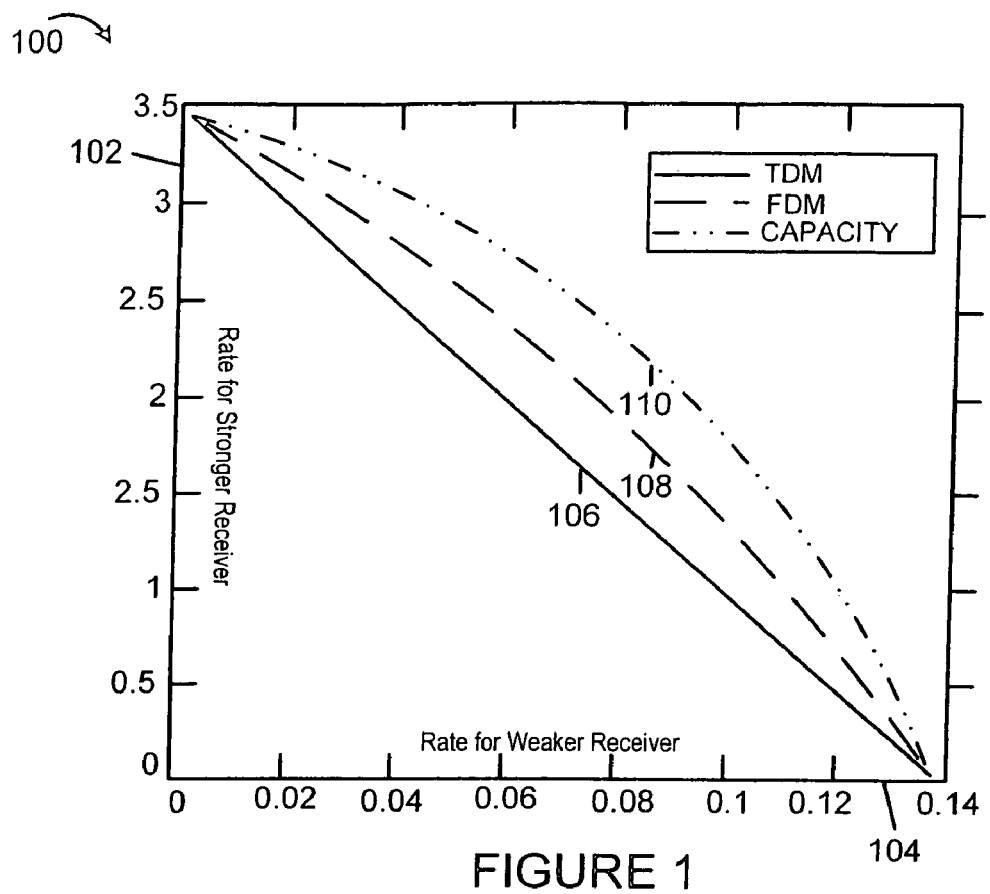
FIG. 1 shows a graph illustrating achievable rates in a broadcast channel for a first user with a stronger receiver and a second user with a weaker receiver under three different transmission strategies.
Figure 2:
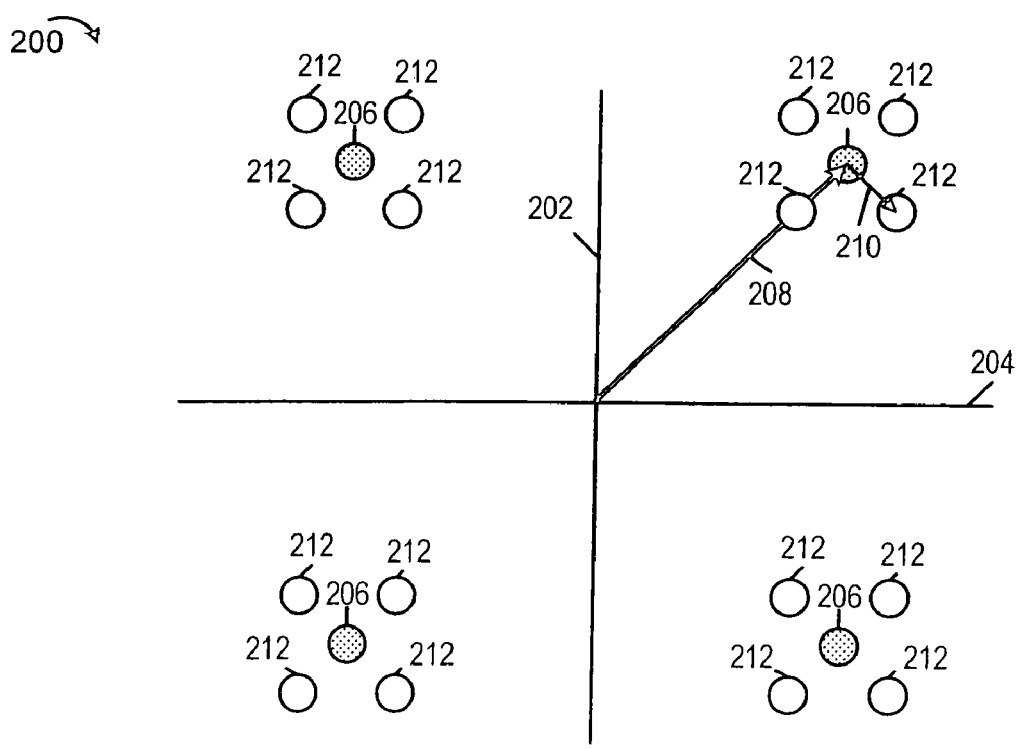
FIG. 2 illustrates an example of superposition coding with QPSK modulation.
Figure 3:
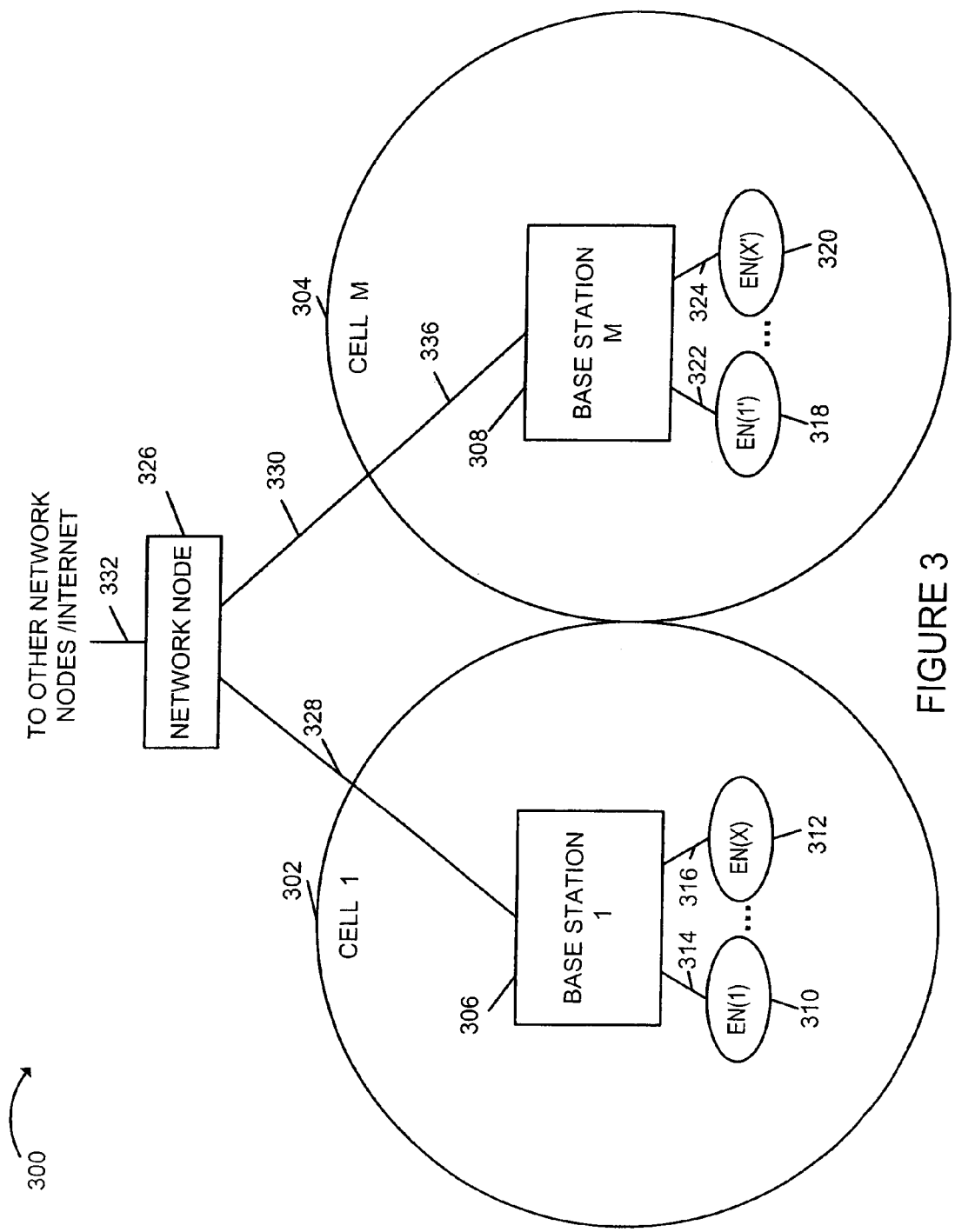
FIG. 3 illustrates an exemplary communications systems implementing the apparatus and methods of the present invention.

FIG. 3 illustrates an exemplary wireless communications system 300 implemented in accordance with and using the methods of the present invention. Exemplary wireless communications system 300 opportunistically uses controlled superposition coding methods on uplink channels and downlink channels in accordance with the present invention. Exemplary wireless communications system 300 is a spread spectrum OFDM (orthogonal frequency division multiplexing) multiple-access system. While an exemplary OFDM wireless communications system is used in this application for purposes of explaining the invention, the invention is broader in scope than the example, and the invention can be applied in many other communication systems, e.g. a CDMA wireless communications system, as well where controlled superposition coding is employed.

System 300 includes a plurality of cells: cell 1 302, cell M 304. Each cell (cell 1 302, cell M 304) includes a base station (BS), (BS 1 306, BS M 308), respectively, and represents the wireless coverage area of the base station. BS 1 306 is coupled to a plurality of end nodes, (EN(1) 310, EN(X) 312) via wireless links (314, 316), respectively. BS M 308 is coupled to a plurality of end nodes, (EN(1') 318, EN(X') 320) via wireless links (322, 324), respectively. The end nodes 310, 312, 318, 320 may be mobile and/or stationary wireless communications devices and are referred to as wireless terminals (WTs). Mobile WTs are sometimes referred to as mobile nodes (MNs). MNs may move throughout system 300. BS 1 306 and BS M 308 are coupled to network node 326 via network links 328, 330, respectively. Network node 326 is coupled to other network nodes and the Internet via network link 332. Network links 328, 330, 332 may be, e.g., fiber optic cables.

Figure 4:
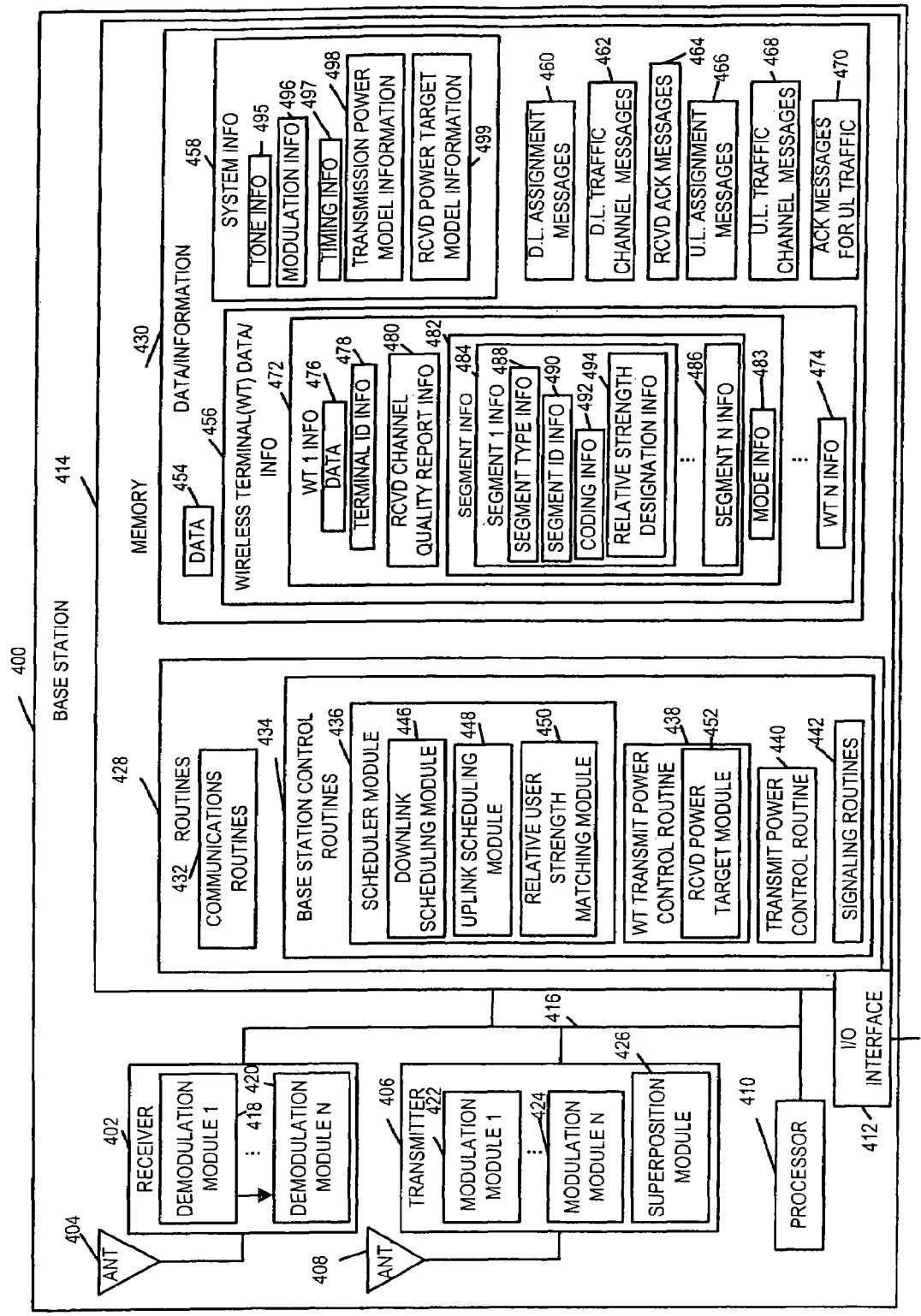
FIG. 4 illustrates an exemplary base station implemented in accordance with the present invention.

FIG. 4 is an illustration of an exemplary base station 400 implemented in accordance with the invention. Exemplary base station 400 may be a more detailed representation of any of the base stations 306, 308 of FIG. 3. Base station 400 includes a receiver 402, a transmitter 406, a processor 410, an I/O interface 412, and a memory 414 coupled together via bus 416 over which the various elements may interchange data and information.

Figure 5:
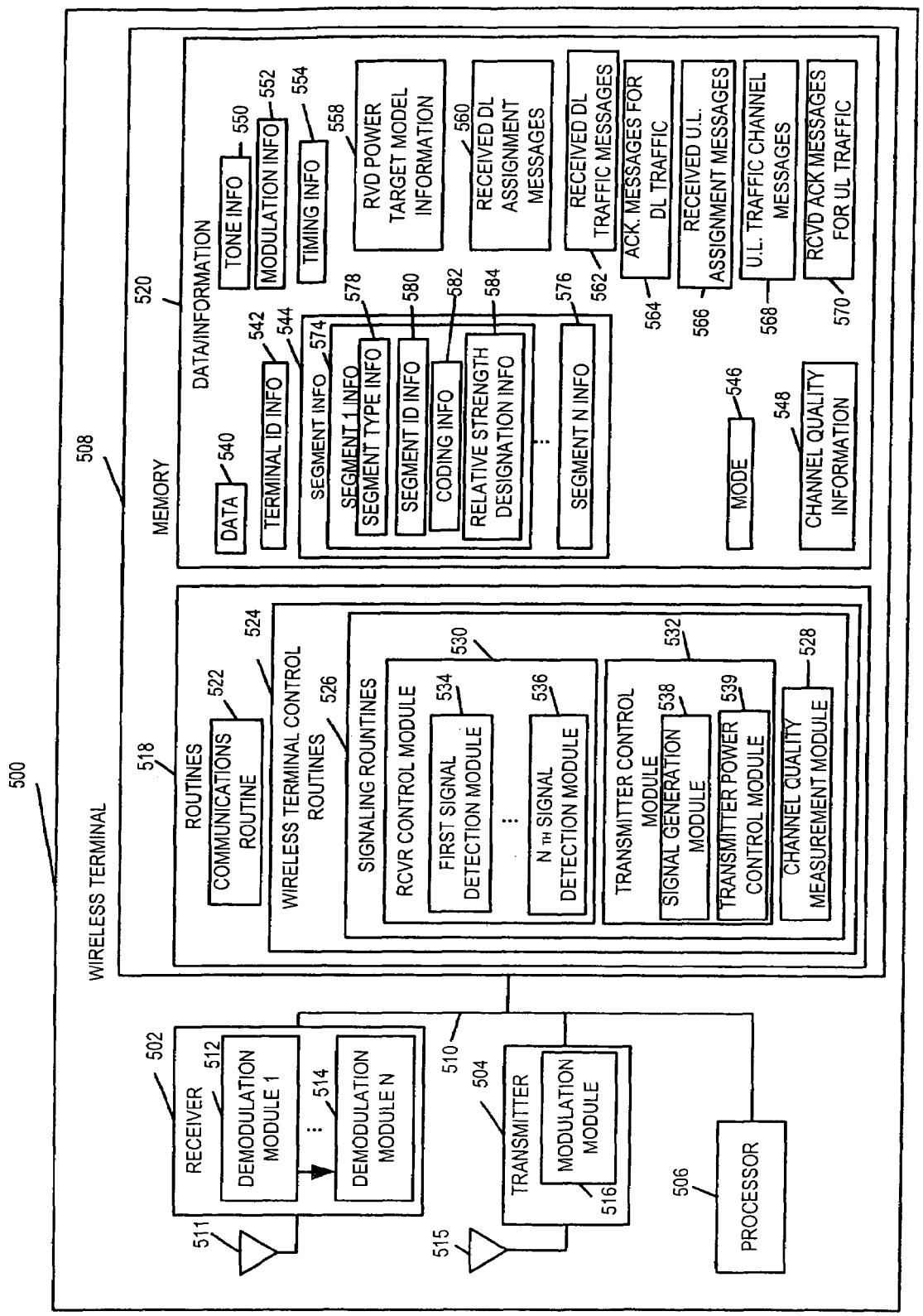
FIG. 5 illustrates an exemplary wireless terminal implemented in accordance with the present invention.

The receiver 402 is coupled to an antenna 404 through which base station 400 may receive uplink signals from a plurality of wireless terminals (WTs) 500 (See FIG. 5). Such uplink signals may include uplink traffic signals transmitted by different wireless terminals 500 on the same traffic segment which may superpose in the air and/or acknowledgment signals transmitted by different wireless terminals on the same acknowledgement segment which may superpose in the air, in accordance with the invention. Receiver 402 includes a plurality of demodulation modules, demodulation module 1 418, demodulation module N 420. In some embodiments, the demodulation modules 418, 420 may be part of a decoder module. The demodulation modules 418, 420 are coupled together. Demodulation module 1 418 may perform a first demodulation on a received superposed signal recovering a high power or highly protected signal. The demodulated information may be forwarded from demodulation module 1 418 to demodulation module N 420. Demodulation module N 420 may remove the high power or highly protected signal from the received superposed signal, and then demodulate the low power or less protected signal. In some embodiments, separate receivers 402 and/or separate antennas 404 may be used, e.g., a first receiver for the high (received) power or highly protected uplink signals and a second receiver for the low (received) power or low protection uplink signals.

Transmitter 406 is coupled to an antenna 408 through which base station 400 may transmit downlink signals to a plurality of wireless terminals 500. Such downlink signals may include superposed signals, e.g., a composite of two or more signals on the same channel segment, each signal of the composite at a different transmission power level, and each signal intended for a different wireless terminal. Superposed downlink signals may be opportunistically transmitted on assignment segments, on downlink traffic signals, and/or on acknowledgement segments, in accordance with the invention. Transmitter 406 includes a plurality of modulation modules, modulation module 1 422, modulation module N 424, and a superposition module 426. Modulation module 1 422 may modulate a first set of information, e.g., into a high power or highly protected signal, and modulation module N 424 may modulate a second set of information into a low power or low protection signal. Superposition module 426 combines the high power or highly protected signal with the low power or low protection signal such that a composite signal may be generated and transmitted on the same downlink segment. In some embodiments, multiple transmitters 406 and/or multiple antennas 408 may be used, e.g., a first transmitter for the high powered or highly protected downlink signals and a second transmitter for the low powered or low protection downlink signals.

I/O interface 412 is an interface providing connectivity of the base station 400 to other network nodes, e.g., other base stations, AAA server nodes, etc., and to the Internet. Memory 414 includes routines 428 and data/information 430. Processor 410, e.g., a CPU, executes the routines 428 and uses the data/information 430 in memory 414 to operate the base station 400 in accordance with the methods of the present invention.

Routines 428 include communications routines 432 and base station control routines 434. Base station control routines 434 include a scheduler module 436, wireless terminal power control routines 438, transmit power control routines 440, and signaling routines 442. Scheduler 436 includes a downlink scheduling module 446, an uplink scheduling module 448, and a relative user strength matching module 450. WT transmit power control routine 438 includes a received power target module 452.

Data/Information 430 includes data 454, wireless terminal data/information 456, system information 458, downlink assignment messages 460, downlink traffic channel messages 462, received acknowledgement messages 464, uplink assignment messages 466, uplink traffic channel messages 468, and acknowledgement messages for uplink traffic 470.

Data 454 includes user data, e.g., data received from WTs over wireless links, data received from other network nodes, data to be transmitted to WTs, and data to be transmitted to other network nodes. Wireless terminal data/information 456 includes a plurality of WTs information, WT 1 information 472, WT N information 474. WT 1 information 472 includes data 476, terminal identification (ID) information 478, received channel quality report information 480, segment information 482, and mode information 483. Data 476 includes user data received by BS 400 from WT 1 intended for a peer node of WT 1, e.g., WT N, and user data intended to be transmitted from BS 400 to WT1. Terminal ID information 478 includes a base station assigned ID used to identify WT1 in communications and operations with BS 400. Received channel quality report information 480 includes downlink channel quality feedback information such as, e.g., SNR (signal-to-noise-ratio), SIR (signal-to-interference-ratio). Mode information 483 includes information indicating the current mode of WT1, e.g., on state, sleep state, etc.

Segment information 482 includes a plurality of segment information sets corresponding to channel segments assigned to WT1, segment 1 information 484, segment N information 486. Segment 1 information 484 includes segment type information 488, segment ID information 490, coding information 492, and relative strength designation information 494. Segment type information 488 includes information identifying the segment's type, e.g., assignment segment for uplink traffic, assignment segment for downlink traffic, uplink traffic channel segment, downlink traffic channel segment, acknowledgment channel segment corresponding to an uplink traffic channel segment, acknowledgement segment corresponding to a downlink traffic channel segment. Segment identification (ID) information 490 includes information used in identifying the segment, e.g., information used in identifying the frequencies, time, duration, and/or size associated with the segment. Coding information 492 includes information identifying the type of coding and/or modulation used for the segment. Relative strength designation information 494 includes information indicating the designated WT relative strength for the purposes of communication on this segment. In some embodiments, the relative strength designation information 494 includes information identifying the WT as either a weak or strong WT for the purposes of communications on this segment.

System information 458 includes tone information 495, modulation information 496, timing information 497, transmission power model information 498, and received power target model information 499. Tone information 495 includes information identifying tones used in hopping sequences, channels, and/or segments. Modulation information 496 includes information used by BS 400 to implement the various modulation and/or coding schemes, e.g., coding rate information, modulation type information, error correction code information, etc. Timing information 497 may include timing information used for hopping sequences, superslots, dwells, durations of channel segments, and timing relationships between different types of channel segments, e.g., a timing relationship between an assignment segment, a traffic channel segment, and an acknowledgment channel segment. Transmission power model information 498 may include information defining models distinguishing transmission power levels of a strong signal and a transmission power level of a weak signal, wherein the two signals are transmitted on the same channel segment as a combined superposed signal, in accordance with the invention. Received power model target information 499 may include information such as lookup tables used to define models for controlling the WT transmit power to transmit at an appropriate power level in order to achieve a received power target at BS 400 for an uplink channel segment signal. In some embodiments, a received power model target for a wireless terminal is a function of coding rate and classification of the user (wireless terminal) as a strong or weak user (wireless terminal). In such an embodiment, for the same coding rate, the received power targets may be very different between the strong and weak classification, e.g., a value >3 dB such as 10 dB.

Downlink assignment messages 460 include assignment messages used to notify a WT terminal that it has been assigned a downlink traffic channel segment. Downlink assignment messages 460 are transmitted by BS 400 to WTs on downlink assignment channel segments. In accordance with the invention, multiple downlink assignment messages may be transmitted to multiple WTs on the same assignment segment using controlled superposition coding. Downlink traffic messages 462 include data and information, e.g., user data, transmitted from BS 400 to WTs on downlink traffic channel segments. In accordance with the invention, downlink traffic channel messages 462 may be transmitted to multiple WTs on the same assignment segment using controlled superposition coding. Received acknowledgement messages 464 include acknowledgement signals from WTs to BS 400 indicating whether or not a WT has successfully received data/information on an assigned downlink traffic channel segment. In accordance with the invention, acknowledgement messages 464 may have been transmitted by multiple WTs, e.g., with very different received power target levels, to BS 400 on the same assignment segment and the signals may have superposed in the air link.

Uplink assignment messages 466 include assignment messages used to notify a WT terminal that it has been assigned an uplink traffic segment. Uplink assignment messages 466 are transmitted by BS 400 to WTs on downlink assignment channel segments used for assigning uplink channel segments. In accordance with the invention, multiple uplink assignment messages may be transmitted to multiple WTs on the same assignment segment using controlled superposition coding. Uplink traffic channel messages 468 include data and information, e.g., user data, transmitted from WTs to BS 400 on uplink traffic channel segments. In accordance with the invention, uplink traffic channel messages 468 may be transmitted by multiple WTs, e.g., with very different received power target levels, to BS 400 on the same assignment segment and the signals may superpose over the air link. Acknowledgement messages for uplink traffic 470 include acknowledgement signals to be transmitted from BS 400 to WTs indicating whether or not BS 400 has successfully received data/information on an assigned uplink traffic channel segment. In accordance with the invention, multiple acknowledgement messages for uplink traffic 470 may be transmitted to multiple WTs on the same acknowledgement segment using controlled superposition coding.

Communications routines 432 is used for controlling base station 400 to perform various communications operations and implement various communications protocols. Base station control routine 434 is used to control the base station 400 operations, e.g., I/O interface control, receiver 402 control, transmitter 406 control, and to implement the steps of the method of the present invention. The scheduler module 436 is used to control transmission scheduling and/or communication resource allocation. The scheduler module 436 may serve as a scheduler. The downlink scheduling module 446 schedules WTs to downlink channel segments, e.g., downlink traffic channel segments. Downlink scheduling module 446 may opportunistically schedule multiple WTs to the same downlink segment, e.g., the same downlink traffic channel segment. The uplink scheduling module 448 schedules WTs to uplink channel segments, e.g., uplink traffic channel segments. The uplink scheduling module 448 may opportunistically schedule multiple WTs to the same uplink segment, e.g., the same uplink traffic channel segment. In some embodiments, the opportunistic scheduling and classification of multiple users as weaker/stronger on some corresponding downlink and uplink segments, may be interrelated and follow predetermined methods known to both base station 400 and WTs 500.

Relative user strength matching module 450 may use the received channel quality report information 480 from multiple WTs to classify users with respect to each other on a relative basis as weaker/stronger and to match users, e.g., one relative weaker with one relative stronger, for concurrent scheduling on a given channel segment. In some embodiments, the relative strength matching routine 450 may use other criteria in addition to or in place of the channel quality report information 480 to determine WT matching. For example, some WTs in the population of wireless terminals, e.g., low cost devices, may not have the appropriate demodulation and/or decoding capability to decode a weak signal superposed with a strong signal, and thus should not be scheduled as a strong receiver. Other WTs in the population, e.g., stationary wireless devices with less stringent size and power constraints, may be good candidates for decoding weak signals superposed on strong signals, and thus can be a good choice for scheduling as a strong receiver.

WT power control routine 438 controls the transmission power levels of the WTs operating within BS 400's cell. Received power target module 452 uses the data/information 430 including the received power target model information 499, the coding information 492, and the relative strength designation information 494 to determine a received power target for uplink signals on uplink segments. Transmit power control routine 440 uses the data/information 430 including the transmission power model information 498, coding info 492, and relative strength designation information 494 to control the transmitter 406 to transmit downlink signals at the appropriate assigned strength for the given segment. Signaling routines 442 may be used by receiver 402, transmitter 406, and I/O interface 412 to control the generation, modulation, coding ,transmission, reception, demodulation, and/or decoding of communicated signals.

FIG. 5 is an illustration of an exemplary wireless terminal 500 implemented in accordance with the invention. Exemplary wireless terminal 500 may be a more detailed representation of any of end nodes 310, 312, 318, 320 of FIG. 3. Wireless terminal 500 may be a stationary or mobile wireless terminal. Mobile wireless terminals are sometimes referred to as mobile nodes and may move throughout the system. Wireless terminal 500 includes a receiver 502, a transmitter 504, a processor 506, and a memory 508 coupled together via bus 510 over which the various elements may interchange data and information.

The receiver 502 is coupled to an antenna 511 through which wireless terminal 500 may receive downlink signals from a base station 400. Such downlink signals may include controlled superposed assignments signals, controlled superposed downlink traffic signals, and/or controlled superposed acknowledgement signals transmitted by base station 400 in accordance with the invention. Receiver 502 includes a plurality of demodulation modules, demodulation module 1 512, demodulation module N 514. In some embodiments, the demodulation modules 512, 514 may be part of a decoder module(s). The demodulation modules 512, 514 are coupled together. Demodulation module 1 512 may perform a first demodulation on a received superposed signal recovering a high power or highly protected signal. The demodulated information may be forwarded from demodulation module 1 512 to demodulation module N 514. Demodulation module N 514 may remove the high power or highly protected signal from the received superposed signal, and then demodulate the low power or less protected signal. In some embodiments, separate receivers 502 and/or separate antennas 511 may be used, e.g., a first receiver for the high power or highly protected downlink signal recovery and a second receiver for the low power or low protection downlink signal recovery. In some embodiments, it may be possible to decode the weaker or less protected signal component of a superposed downlink signal directly without first removing the contribution of the stronger or better protected signal component.

Transmitter 504 is coupled to an antenna 515 through which wireless terminal 500 may transmit uplink signals to a base station 400. Such uplink signals may include uplink traffic channel signals and acknowledgements signals. Transmitter 505 includes a modulation module 516. Modulation module 506 may modulate data/information into uplink signals. In some embodiments, the modulation module 506 may be part of an encoder module. The transmitter 504 may be controlled in terms of output power and/or modulation to output uplink signals with different levels of target received power and/or different relative levels of protection, e.g., high targeted received power signals (or highly protected signals) and low targeted received power signals (or less protected signals) for different uplink channel segments in accordance with the invention.

Memory 508 includes routines 518 and data/information 520. Routines 518 include communications routine 522 and wireless terminal control routines 524. Wireless terminal control routines 524 include signaling routines 526 and channel quality measurement module 528. Signaling routines 526 include a receiver control module 530 and a transmitter control module 532. Receiver control module 530 includes a plurality of signal detection modules, first signal detection module 534, Nth signal detection module 536. Transmitter control module 532 includes a signal generation module 538 and a transmitter power control module 539.

Data/Information 520 includes data 540, terminal identification (ID) information 542, segment information 544, mode information 546, channel quality information 548, tone information 550, modulation information 552, timing information 554, transmission power model information 556, received power target model information, received downlink assignment messages 560, received downlink traffic channel messages 562, acknowledgement messages for downlink traffic 564, uplink assignment messages 566, uplink traffic channel messages 568, and received acknowledgement messages for uplink traffic 570.

Data 540 includes user data, e.g., data from a communication peer of WT 500 routed through BS 400 and received in downlink signals from BS 400. Data 540 also includes user data to be transmitted in uplink signals to BS 400 intended for peer nodes of WT 500, e.g., another WT in a communications session with WT 500. Terminal ID information 542 includes a base station assigned ID used to identify WT 500 in communications and operations with BS 400.

Segment information 544 includes a plurality of communication channel segment information sets corresponding to channel segments assigned to WT 500, segment 1 information 574, segment N information 576. Segment 1 information 574 includes segment type information 578, segment identification (ID) information 580, coding information 582, and relative strength designation information 584. Segment 1 information 574 includes segment type information 578, segment ID information 580, coding information 582, and relative strength designation information 584. Segment type information 578 includes information identifying the segment's type, e.g., assignment segment for uplink traffic, assignment segment for downlink traffic, uplink traffic channel segment, downlink traffic channel segment, acknowledgment channel segment corresponding to an uplink traffic channel segment, acknowledgement segment corresponding to a downlink traffic channel segment. Segment identification information 580 may include information used in identifying the segment, e.g., information used in identifying the frequencies, time, duration and/or size associated with the segment. Coding information 582 includes information identifying the type of coding and/or modulation used for the segment. Relative strength designation information 584 includes information indicating the designated WT relative strength for the purposes of communication on this segment. In some embodiments, the relative strength designation information 584 includes information identifying the WT as either a weak or strong WT for the purposes of communications on this segment.

Channel quality report information 548 includes downlink channel quality information such as, e.g., SNR (signal-to-noise-ratio), SIR (signal-to-interference-ratio). Channel quality report information 548 may be obtained from measurements of downlink signals received from BS 400, e.g., measurements of pilot signals and/or beacon signals. Channel quality report information 548 is fed back to BS 400 and is used by the BS 400 in making decisions regarding opportunistically matching and scheduling users as relative weaker/stronger WTs on the same segment, in accordance with the invention.

Mode information 546 includes information indicating the current mode of WT1, e.g., on state, sleep state, etc. Tone information 550 includes information identifying tones used in hopping sequences, channels, and/or segments. Modulation information 552 includes information used by WT 500 to implement the various modulation and/or coding schemes, e.g., coding rate information, modulation type information, error correction code information, etc. Timing information 554 may include timing information used for hopping sequences, superslots, dwells, durations of channel segments, and timing relationships between different types of channel segments, e.g., a timing relationship between an assignment segment, a corresponding traffic channel segment, and a corresponding acknowledgment channel segment. Received power model target information 558 may include information such as look-up tables used to define models for controlling the WT transmit power to transmit at an appropriate power level in order to achieve a received power target at BS 400 for an uplink channel segment signal. In some embodiments, a received power model target for wireless terminal 500 is a function of coding rate and classification of the user (wireless terminal) as a strong or weak user (wireless terminal). In such an embodiment, for the same coding rate, the received power targets may be very different between the strong and weak classification, e.g., a value >3 dB such as 10 dB.

Received downlink assignment messages 560 include received assignment messages from BS 400 used to notify WT terminal 500 that it has been assigned a downlink traffic segment. Downlink assignment messages are transmitted by BS 400 to WT 500 on downlink assignment channel segments. In accordance with the invention, a received downlink assignment message 560 may be one of multiple downlink assignment messages transmitted to multiple WTs on the same assignment segment using controlled superposition coding. Received downlink traffic messages 562 include data and information, e.g., user data, transmitted from BS 400 to WTs on downlink traffic channel segments. In accordance with the invention, a received downlink traffic channel message 562 may be one multiple downlink traffic messages transmitted to multiple WTs on the same assignment segment using controlled superposition coding. Acknowledgement messages for downlink traffic 564 include acknowledgement messages to be transmitted by WT 500 to BS 400 indicating whether or not WT 500 has successfully received data/information on an assigned downlink traffic channel segment. In accordance with the invention, acknowledgement messages 564 may be transmitted, with a controlled received power target, by WT 500 to BS 400 on the same assignment segment used by other WTs.

Received uplink assignment messages 566 include assignment messages used to notify WT 500 that it has been assigned an uplink traffic segment. Received uplink assignment messages 566 are obtained from received signals of BS 400 transmissions to WT 500 on downlink channel segments used for assigning uplink channel segments. In accordance with the invention, a received uplink assignment message 566 may be one of multiple uplink assignment messages transmitted by BS 400 to multiple WTs on the same assignment segment as part of a controlled superposed signal in accordance with the invention. Uplink traffic channel messages 568 include data and information, e.g., user data, transmitted from WT 500 to BS 400 on uplink traffic channel segments. In accordance with the invention, uplink traffic channel messages 568 may be transmitted, with a controlled received power target, by WT 500 to BS 400 on the same assignment segment as other WTs are transmitting uplink traffic channel messages and the signals from multiple WTs may superpose over the air link. Acknowledgement messages for uplink traffic 570 include acknowledgement signals from BS 400 to WTs indicating whether or not BS 400 has successfully received data/information on an assigned uplink traffic channel segment. In accordance with the invention, base station 400 may transmit multiple acknowledgement messages to multiple WTs in a combined controlled superposed signal on the acknowledgment segment.

Communications routine 522 is used for controlling wireless terminal 500 to perform various communications operations and implement various communications protocols. Wireless terminal control routines 524 is used to control the wireless terminal 500 operations, e.g., receiver 502 control, transmitter 504 control, and to implement the steps of the method of the present invention. Signaling routines 526 include a receiver control module 530 used for control related to downlink signaling and a transmitter control module 532 used for control related to uplink signaling. Receiver control module 530 directs the operation of receiver 502 to receiver, demodulate, and/or decode downlink signals from base station 400 including superposed signals. First signal detection module 534 uses the data/information 520 including modulation information 552 and segment information 544 to control demodulation module 1 512 to receive and process signals, e.g., recovering a high power or high protection signal from a superposed downlink signal. Nth. signal detection module 536 uses the data/information 520 including modulation information 552 and segment information 544 to receive and process signals, e.g., recovering a low power or low protection signal from a superposed downlink signal. Transmitter control module 532 directs the operation of transmitter 504 and its modulation module 516 for operations related to uplink signaling such as signal generation and power control. Signal generation module 538 uses data/information 520 including modulation information 552 and segment information 544 to generate uplink signals from uplink information to be communicated, such as, e.g., uplink traffic channel messages 568. Transmitter power control module 539 uses data/information 520 including received power target model information 558 and segment information 544 such as coding information 582 and relative strength designation information 584 to control the transmitter to regulate the uplink signal strength for uplink segments, e.g., individual uplink segments. The transmitter power control module 539 may adjust transmission power levels for individual segments to attempt to reach a received power target level at the base station 400, in accordance with the invention. This control of wireless terminal transmission power with respect to expected received power at a base station allows for the base station 400 to opportunistically schedule multiple wireless terminals on the same uplink segment with different received power targets, to receive an uplink signal including superposed signals from multiple wireless terminals, and to extract the individual signals from each wireless terminal.

Channel quality measurement module 528 performs measurements of received signals, e.g., pilot signals and/or beacon signals, to obtain channel quality information 548.

An exemplary embodiment of the invention is described below in the context of a cellular wireless data communication system. The exemplary system is similar to the systems disclosed in U.S. patent applications Ser. Nos. 09/706,377 and 09/706,132, which are hereby incorporated by reference but include modifications used to implement the present invention. While an exemplary wireless system is used for purposes of explaining the invention, the invention is broader in scope than the example and can be applied in general to many other communication systems as well.

In a wireless data communication system, the air link resource generally includes bandwidth, time and/or code. The air link resource that transports data and/or voice traffic is called the traffic channel. Data is communicated over the traffic channel in traffic channel segments (traffic segments for short). Traffic segments may serve as the basic or minimum units of the available traffic channel resources. Downlink traffic segments transport data traffic from the base station to the wireless terminals, while uplink traffic segments transport data traffic from the wireless terminals to the base station. One exemplary system in which the present invention is used is the spread spectrum OFDM (orthogonal frequency division multiplexing) multiple-access system in which a traffic segment includes of a number of frequency tones over a finite time interval.

In exemplary systems used to explain the invention, the traffic segments are dynamically shared among the wireless terminals that are communicating with the base station. A scheduling function, e.g., module in the base station may assign each uplink and downlink segment to one or more of the wireless terminals, e.g., mobile terminals, based on a number of criteria.

Figure 6:
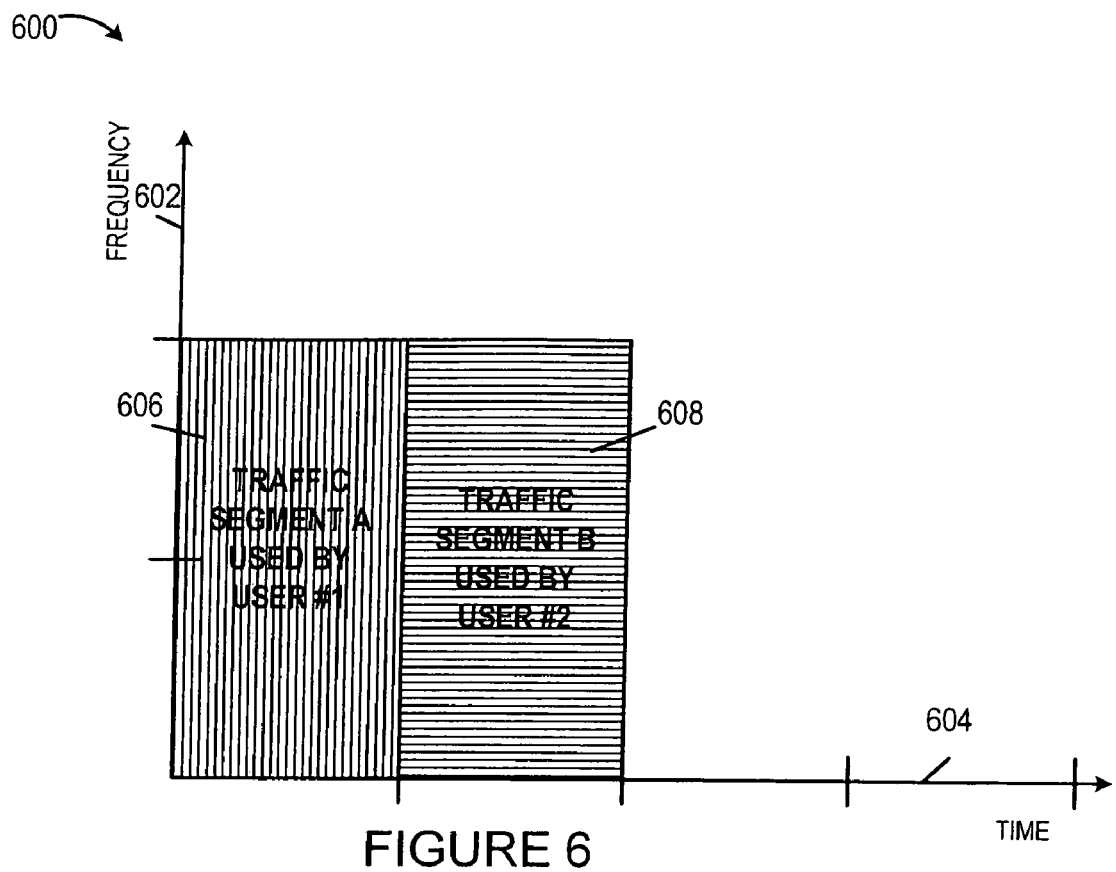
FIG. 6 illustrates exemplary traffic channel segments.

The allocation of traffic segments can be to different users from one segment to another. FIG. 6 is a diagram 600 of frequency on vertical axis 602 vs time on horizontal axis 604 and illustrates exemplary traffic segments. Traffic segment A 606 is indicated by the rectangle with vertical line shading, while traffic segment B 608 is indicated by the rectangle with horizontal line shading. In the example of FIG. 6, traffic segments A 606 and B 608 occupy the same frequencies but occupy different time intervals. In FIG. 6, assume segment A 606 is assigned to user #1 by the base station's scheduler and segment B 608 is assigned to user #2. The base station's scheduler can rapidly assign the traffic channel segments to different users according to their traffic needs and channel conditions, which may be time varying in general. The traffic channel is thus effectively shared and dynamically allocated among different users on a segment-by-segment basis.

Figure 7:
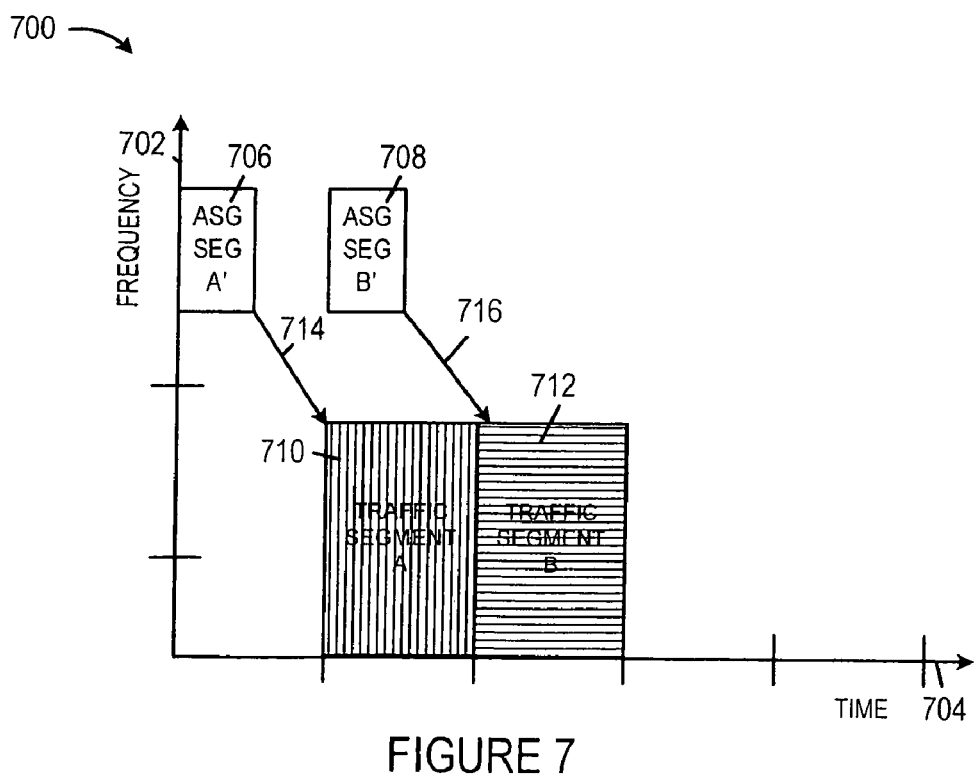
FIG. 7 illustrates exemplary assignment and traffic segments.

In an exemplary system, the assignment information of traffic channel segments is transported in the assignment channel, which includes a series of assignment segments. In a cellular wireless system, assignment segments are generally transmitted in the downlink. There are assignment segments for downlink traffic segments, and separate assignment segments for uplink traffic segments. Each traffic segment may be, and generally is, associated with a unique assignment segment. The associated assignment segment conveys the assignment information of the corresponding traffic segment. The assignment information may include the identifier of the user terminal(s), which is assigned to utilize that traffic segment, the coding and/or modulation scheme to be used in that traffic segment. For example, FIG. 7 is a diagram 700 illustrating exemplary assignment and traffic segments. FIG. 7 shows frequency on vertical axis 702 vs time on horizontal axis 704. FIG. 7 includes two assignment segments, A' 706 and B' 708, and two traffic segments, traffic segment A 710 and traffic segment B 712. The exemplary assignment segments 706, 708 occupy the same frequencies but occupy different time intervals. The exemplary traffic segments 710, 712 occupy the same frequencies but occupy different time intervals. The assignments segments 706, 708 occupy different frequencies than the traffic segments 710, 712. Assignment segment A' 706 conveys the assignment information of traffic segment A 710 as indicated by arrow 714. Assignment segment B' 710 conveys the assignment information for traffic segment B 712 as indicated by arrow 716. Each assignment segment 706, 708 precedes its respective traffic segment 710, 712. The assignment channel is a shared channel resource. The users receive the assignment information conveyed in the assignment channel and then utilize the traffic channel segments according to the assignment information.

Data transmitted by the base station on a downlink traffic segment is decoded by a receiver in the intended wireless terminal while data transmitted by the assigned wireless terminal on the uplink segment is decoded by a receiver in the base station. Typically the transmitted segment includes redundant bits that help the receiver determine if the data is decoded correctly. This is done because the wireless channel may be unreliable and data traffic, to be useful, typically has high integrity requirements.

Figure 8:
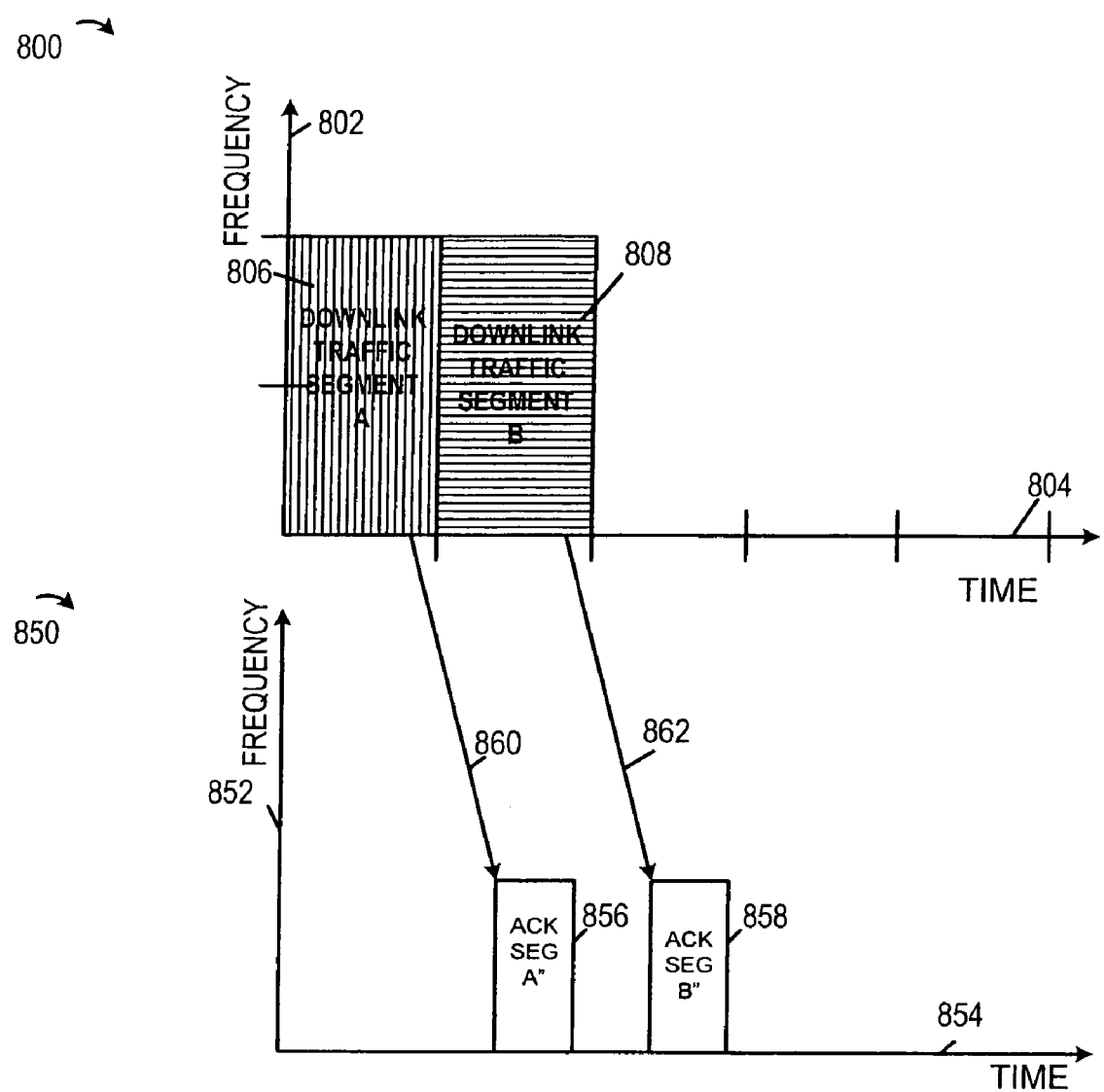
FIG. 8 illustrates exemplary downlink traffic segments and exemplary uplink acknowledgement segments.

Because of the interference, noise and/or channel fading in a wireless system, the transmission of a traffic segment may succeed or fail. In the exemplary system, the receiver of a traffic segment sends an acknowledgment to indicate whether the segment has been received correctly. The acknowledgment information corresponding to traffic channel segments is transported in the acknowledgment channel, which includes a series of acknowledgment segments. Each traffic segment is associated with a unique acknowledgment segment. For a downlink traffic segment, the acknowledgment segment is in the uplink. For an uplink traffic segment, the acknowledgment segment is in the downlink. At the minimum, the acknowledgment segment can convey one-bit of information, e.g., a bit, indicating whether the associated traffic segment has been received correctly or not. Because of the predetermined association between uplink traffic segments and acknowledgement segments, there may be no need to convey other information such as the user identifier or segment index in an acknowledgment segment. An acknowledgment segment is normally used by the user terminal that utilizes the associated traffic segment and not other user terminals. Thus, in both the uplink and the downlink, the acknowledgment channel is a shared resource, as it can be used by multiple users. However, there is generally no contention issue that results from the use of the shared acknowledgment channel, as there is generally no ambiguity in which user terminal is to use a particular acknowledgement segment. FIG. 8 includes a diagram 800 showing exemplary downlink traffic channel segments and a graph 850 showing exemplary uplink acknowledgement segments. Diagram 800 plots frequency on vertical axis 802 vs time on horizontal axis 804. Diagram 800 includes downlink traffic segment A 806 illustrated by vertical line shading and downlink traffic segment B illustrated by horizontal line shading. Each traffic segment 806, 808 occupies the same frequencies but a different time slot. Graph 850 plots frequency on vertical axis 852 vs time on horizontal axis 854. Graph 850 includes uplink acknowledgement segment A" 856 and uplink acknowledgement segment B" 858. Each acknowledgement segment 856, 858 occupies the same frequencies but a different time slot. The two uplink acknowledgment segments, A" 856 and B" 858, convey the acknowledgment information of downlink traffic segments A 806 and B808, respectively. The linkage between traffic segments A 806 to acknowledgement segment A" 856 is indicated by arrow 860; the linkage between traffic segment B 808 and acknowledgement segment B" 858 is indicated by arrow 862.

This invention realizes the benefits of superposition coding in a multi-user communication system while using simple receiver design in both the broadcast channel and the multiple-access channel. The advantages of using superposition coding are greater in systems where there is a large dynamic range in the channel quality experienced by different users. In wireless communication systems, it is common to find the channel quality varying by as much as 30 dB or even higher (three orders of magnitude) among various users. The advantages conferred by this invention contribute significantly to enhanced system capacity in such systems.

Figure 9:
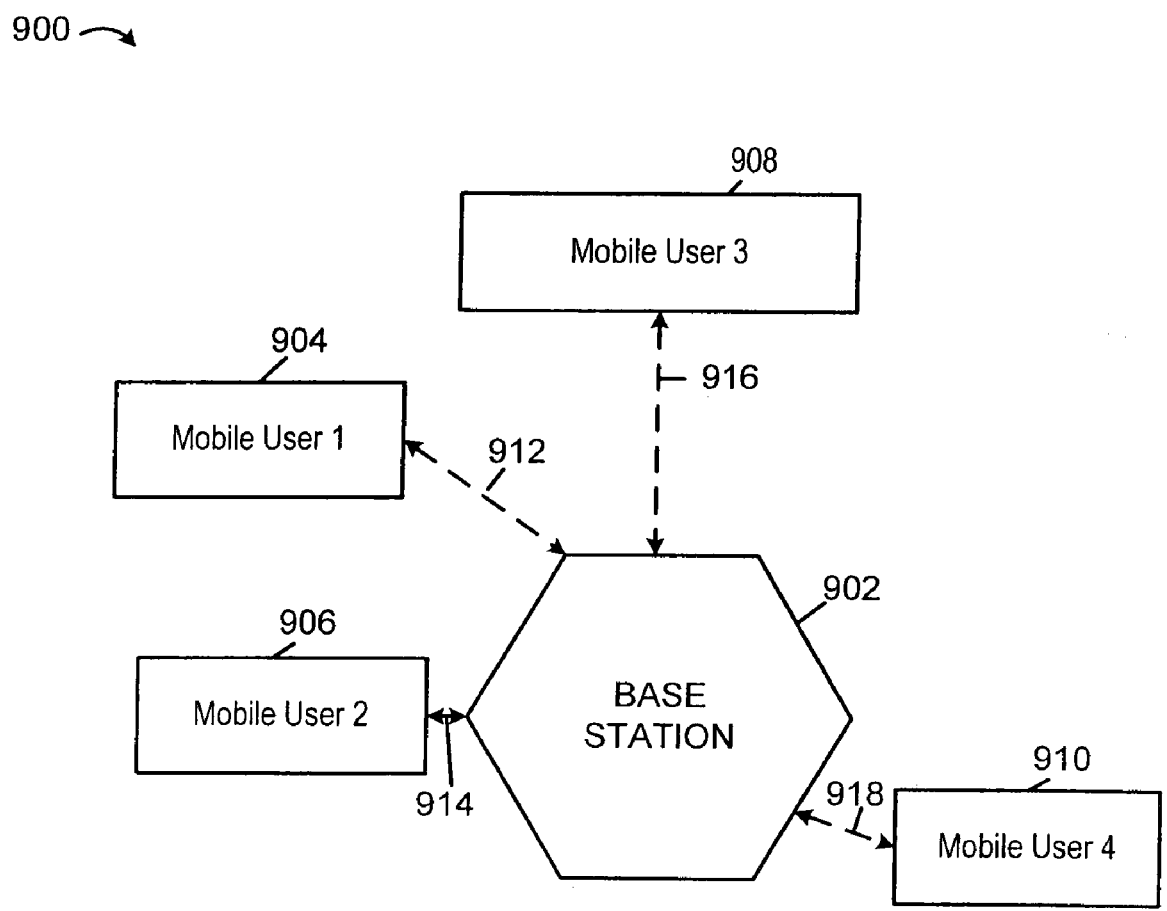
FIG. 9 illustrates an exemplary communications system implemented in accordance with the present invention.

Superposition coding, in accordance with the present invention, in the context of the downlink (broadcast) channel shall now be described. Consider the downlink (broadcast) channel in a multi-user wireless communication system such as the one just described. The transmitter of this downlink (broadcast) channel is the base station and the receivers are mobile or fixed wireless user terminals, e.g., sometimes referred to as mobile users or users, served by the base station. An example of such a system is illustrated in exemplary system 900 of FIG. 9 where a base station 902 is communicating on the downlink as well as the uplink with four mobile users, mobile user 1 904, mobile user 2 906, mobile user 3 908, mobile user 4 910 via wireless links 912, 914, 916, 918, respectively. The mobile users 904, 906, 908, 910 are at different distances from the base station 902 and consequently may experience different channel conditions. The users 904, 906, 908, 910 frequently update the base station 902 with a measure of the downlink channel quality and interference condition they currently experience. The base station 902 typically uses this information to schedule users for transmission and allocates the downlink channel resources to them. For example, the base station 902 can use the channel quality and interference condition report to allocate transmission power to different users 904, 906, 908, 910 on the broadcast channel. Users, e.g. mobile user 2 906 and mobile user 4 910 who are closer to the base station 902 are generally allocated smaller amounts of power while users, e.g., mobile user 1 904 and mobile user 3 908, who are located farther away from the base station 902 are allocated large amounts of power. Bandwidth can be allocated appropriately to different users 904, 906, 908, 910 based on the channel conditions. The most commonly used metric of channel quality is the receive signal-to-noise ratio (SNR), while other similar or equivalent metrics can be used.

In accordance with the invention, the base station scheduler can select two or more user terminals to be scheduled on the same traffic segment. The selected terminals should preferably have SNRs that span a wide dynamic range. Superposition coding is then used to send data to the selected terminals on the same traffic segment. It should be pointed out here that practically speaking, the advantages of using superposition coding may be realizable by scheduling two appropriately selected users on a given traffic segment although, in some embodiments, larger numbers of users may be scheduled. Scheduling a small number of users, e.g., two, has the advantage of resulting in a significantly less decoding effort at user terminals compared to the case when a larger number of users (>2) are scheduled on the same traffic segment.

In accordance with the invention, the base station is not always required to use superposition coding, but can do so in an opportunistic manner. When it is infeasible, or impractical, to schedule users that experience different channels, the base station can default to the simple state where it transmits to a single user.

An important aspect that should be underscored in this context is that the users need not, and normally are not, pre-assigned 'strong' and 'weak' labels. The separation of users into 'weaker' and 'stronger' subsets is not a static partition, but rather a relative definition for the users who can potentially be scheduled simultaneously in the same broadcast channel. For instance, consider three users denoted 'A', 'B' and 'C' who are labeled in decreasing order of their channel quality, i.e., user 'A' has the best channel quality, user 'C' the worst channel quality, and user 'B' has an intermediate channel quality. In a broadcast channel scenario, the transmitter will consider 'B' to be a 'strong user' and 'C' a 'weak user' when transmitting to these two users together using superposition coding. On the other hand, when transmitting to users 'A' and 'B' simultaneously, user 'A' is considered the strong user, with user B being considered the weak user. In the broadcast channel scenario, the users can derive their current status from the control channel that transmits the assignment information about which users are currently scheduled with high or low power signals. In general, the signal intended for the weaker users is protected more e.g., with better coding or higher power, than the signal intended for stronger users, which are protected less.

Figure 10:
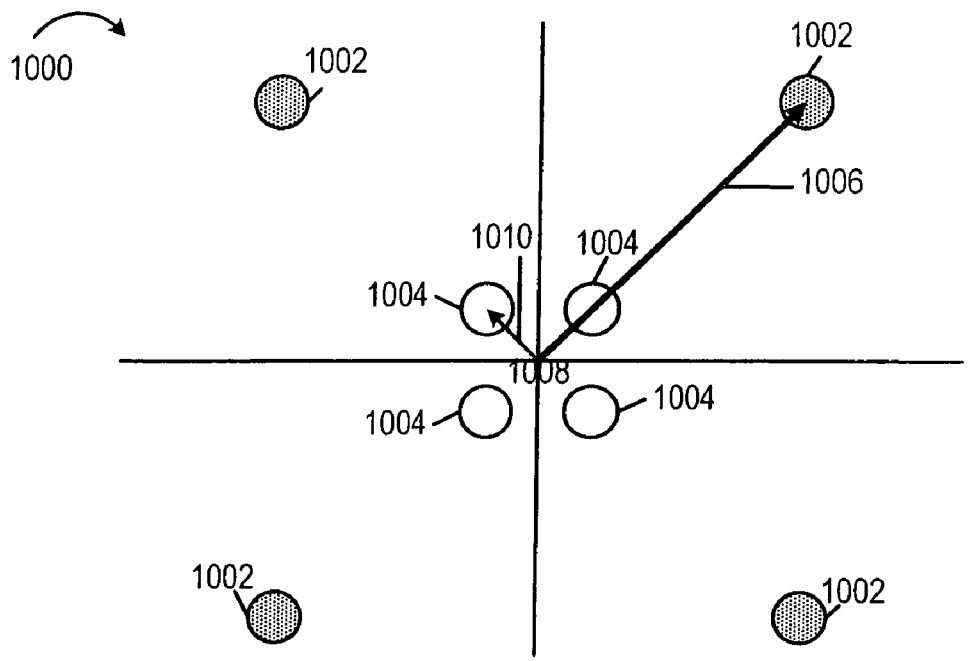
FIG. 10 illustrates superposition coding in a multiple-access channel in accordance with the present invention.

Superposition coding, in accordance with the present invention, in the context of the uplink (multiple-access) channel shall now be described. An important facet of this invention is that it can be applied in a dual sense in the multiple-access context. The receiver of the uplink (multiple-access) channel is the base station and the transmitters are the user terminals served by the base station. Typically, the multiple-access channel is divided among the users in time or code space or frequency. Alternatively, the channel may be shared among multiple users, with their signals interfering with each other at the base station receiver. A CDMA system is an example of a system where the channel may be shared among multiple users. The user signals can be separated using joint detection (also known as multi-user detection) techniques. In practice, however, this is quite complex. In accordance with the invention, the base station scheduler can select two or more user terminals to transmit uplink data on the same traffic segment resource. The signals from the selected terminals are superposed in the transmission medium. FIG. 10 is a diagram 1000 used for illustrating superposition coding in a multiple-access channel in accordance with the present invention. FIG. 10 shows different receive power targets of two superposed signals. FIG. 10 includes an exemplary high power QPSK signal illustrated by the four shows shaded circles 1002 and an exemplary low power QPSK signal 1004 illustrated by the four unshaded circles. The strength of the high power signal may be represented by long arrow 1006 from the origin 1008 to a point 1002 with magnitude $\sqrt{(1-\alpha)P}$, while the strength of the low power signal may be represented by short arrow 1010 from the origin 1008 to a point 1004 with magnitude $\sqrt{\alpha P}$. The base station scheduler can coordinate operations so that the selected user terminal uplink signals are received at different power levels. In one embodiment, wireless terminals with smaller path loss may be operated so that their uplink signals are to be received by the base station at a relative higher power, while wireless terminals with larger path loss may be operated so that their uplink signals are to be received by the station at a relative lower power. In this case, it can be advantageous for the scheduler to select user terminals that span a large range of path losses for the same traffic segment. In another embodiment applicable to cellular systems, the user terminals that cause less out-of-cell interference may be operated so that their signals are to be received by the base station at relative higher power, while the user terminals that cause more out-of-cell interference may be operated so that their signals are to be received by the base station at relative lower power. In this case the scheduler can select terminals that span a large range in the out-of-cell interference that they create for the same traffic segment.

It should also be pointed out that in practical systems, most of the gain in using superposition coding may be available by operating the scheduler to select two user terminals to transmit on the same traffic segment. This implementation of superposition coding which schedules two users on the same traffic segment, as opposed to scheduling three or more users on the same traffic segment, has the advantage of keeping the base station receiver simple.

Users are not pre-assigned 'strong' and 'weak' labels. The labeling of users as 'stronger' or 'weak', in accordance with the invention, is in a relative context. A 'strong' user in this case refers to a user terminal that is operated to be received at a higher power compared with another 'weaker' user transmitting on the same traffic segment. A user can learn whether it should target a higher or lower receive power level, e.g., from a control channel, in which the base station may, and in various embodiments does, instruct the users about the assignment information of the traffic channel.

In the event that the base station is constrained, it can choose not to schedule more than one user terminal on one traffic segment. This choice is completely transparent to the users, which really do not need to do anything different whether superposition is used or not.

The use of superposition coding on the assignment channel, in accordance with the present invention will now be described. An exemplary application of this invention to the assignment channel will now be described in detail in this section using the context of an exemplary OFDM-based cellular wireless system.

In the exemplary system, the downlink traffic channel fits within the broadcast communications method regime, while the uplink traffic channel is a typical example of the multiple-access communications method. Both the downlink and uplink traffic segments are dynamically assigned to the users according to the scheduler decisions made by the base station scheduler. Moreover, the base station scheduler also determines the coding and modulation rate used in the traffic segment. The assignment channel is the control channel that conveys the assignment information to the wireless terminals, e.g., mobile user terminals. This embodiment of the invention is described using two subsystems, one for the downlink broadcast channel, and the other for the uplink multiple-access channel.

The subsystem of the downlink broadcast channel will be described first. Each mobile user in the system frequently updates the base station of its downlink channel condition, e.g., in a channel quality and interference condition feedback report. This report may include various parameters such as signal-to-noise ratio, channel frequency profile, fading parameters, etc. The base station schedules two or more users and superposes user signals on each downlink traffic segment. The base station also selects parameters, such as code rates and transmission power, for the superposed signals. The scheduler decisions corresponding to a traffic segment are communicated on the corresponding assignment segment, which is monitored by the users, e.g., wireless terminals. When multiple users are scheduled on the same data segment in the context of this embodiment of the invention, the assignment information can also be superposition coded on the assignment segment.

Figure 11:
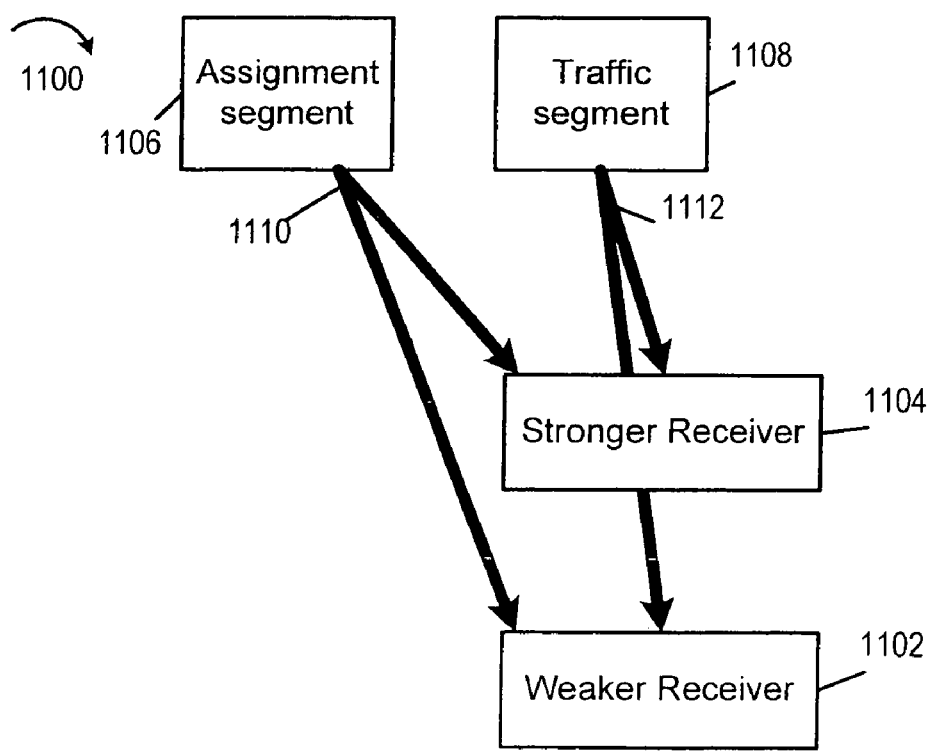
FIG. 11 illustrates superposition coding used in broadcast assignment and broadcast traffic channels, in accordance with the present invention.

To underscore this aspect of the invention, consider one example in which two users are allocated the same traffic segment 1108 as illustrated in drawing 1100 of FIG. 11. FIG. 11 includes two exemplary receivers, a weaker receiver 1102 and a stronger receiver 1104. FIG. 11 also includes an assignment segment 1106 and a traffic segment 1108. The base station transmits a composite assignment signal with superposition coding 1110 to both receivers 1102, 1104. The base station subsequently transmits a composite traffic signal with superposition coding 1112 to both receivers 1102, 1104. The assignment information for the weaker receiver 1102 is sent as high power signal of the superposition codes on the assignment channel, while the assignment information for the stronger receiver 1104 is sent as the low power signal of the superposition codes on the assignment channel. A user 1102, 1104 first decodes the high power signal component of an assignment segment 1106. If the user is assigned by the high power signal of the assignment segment 1106, as user 1102 is, then the user knows that it is scheduled as 'weaker receiver' and shall also decode the high power signal of the composite signal 1112 of the corresponding traffic channel segment 1108. Otherwise, the user shall proceed to decode the low power signal of the assignment segment 1106 since it may be considered the stronger receiver. Again, if the user is assigned by the low power signal of the assignment segment, as receiver 1104 is, then the user knows that it is scheduled as 'stronger receiver' and shall proceed to decode the low power signal of the corresponding traffic channel segment 1108. If the user is not assigned by the low power signal of the assignment segment 1106, or cannot even decode the low power signal of composite assignment signal 1110, the user may not be in a position to decode the low power signal of the composite traffic signal 1112 of the traffic segment 1108 and can choose not to attempt to decode it. In the more general case, what has been referred to as the high power signal can be a better protected signal and what has been referred to as the low power signal can be a less protected signal.

Figure 12:
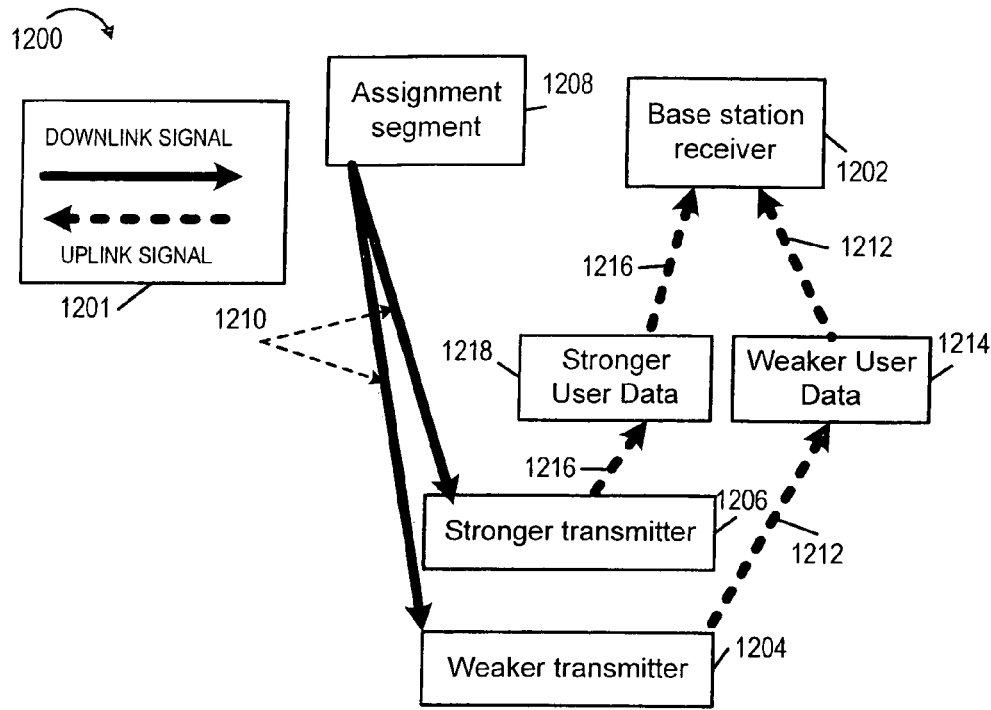
FIG. 12 illustrates superposition coding used in broadcast assignment and multiple-access traffic channels, in accordance with the present invention.

The controlled superposition coding paradigm described in the framework of the downlink subsystem can also be applied to the subsystem of the uplink multiple-access channel. FIG. 12 is a drawing 1200 illustrating superposition coding used in broadcast assignment and multiple-access traffic channels. FIG. 12 includes a key 1201 illustrating that solid heavy arrows denote downlink signals while heavy dashed arrows denote uplink signals. FIG. 12 includes a base station receiver 1202, a first user, e.g. a wireless terminal, designated the weaker transmitter 1204, and a second user, e.g., a wireless terminal, designated the stronger transmitter 1206. FIG. 12 also shows an assignment segment 1208. A downlink composite assignment signal 1210, including superposition coding, is transmitted from the base station to the two wireless terminals 1204, 1206 on the assignment segment 1208. Wireless terminal 1204 transmits signal 1214 including weaker user data 1212 to base station receiver 1202, while wireless terminal 1206 transmits signal 1216 including stronger user data 1218 to base station receiver 1202. Signals 1212 and 1216 are transmitted on the same uplink traffic segment and the signals are superposed over the air.

In particular, as shown in FIG. 12, the base station schedules one or more users 1204, 1206, who then superpose their signals 1212, 1216 on a single uplink traffic segment over the air. The base station can also select parameters, such as code rates and transmission power, for the superposed signals 1212, 1216. The base station makes the scheduling decision with a bias towards users who can be power controlled in a manner such that they are received at different powers at the base station. For example, in accordance with the invention, the users that are superposed can be users that in one embodiment, experience different path losses in the uplink or in another embodiment, users that have quite different uplink out-of-cell interference impact. The base station then communicates this decision using superposition coding on the assignment channel in downlink composite assignment signal 1210. A user, e.g., a mobile wireless terminal, first decodes the high power (better protected) signal of an assignment segment 1208. In one embodiment, if the user is assigned by the high power signal of the assignment segment 1208, then the user infers that it is scheduled by the base station as a 'weaker transmitter' and shall send on the corresponding uplink traffic segment to be received at lower power. In FIG. 12, user 1204 has inferred that it is scheduled by the base station as the weaker transmitter and transmits uplink traffic signal 1212 at a low targeted receive power level. Analogously, if the user is in a position to decode the low power (less protected) signal included in composite signal 1212 on the assignment channel 1208, and finds that it is scheduled, it infers its current state to be a 'stronger transmitter'. It then proceeds to transmit on the corresponding uplink traffic segment with suitable transmit power such that it is received at higher power. In FIG. 12, user 1206 first decodes and removes the weaker user assignment, then decodes the stronger user assignment, finds that it is scheduled, infers that it is the stronger transmitter, and transmits uplink traffic signal 1216 at a high targeted receive power level. If the user is not assigned by the low power signal of the assignment segment, or cannot even decode the signal, the user may not use the corresponding uplink traffic segment as a 'strong transmitter'. In other embodiments, the notion of stronger and weaker transmitters may be defined based on other criteria such as uplink interference cost or device-related constraints.

In accordance with the invention, superposition coding can, and is, carried out in an opportunistic manner and need not be carried out on each of the traffic segments. This allows the base station scheduler significant flexibility. In the case of both the downlink and uplink subsystems, in some embodiments the low-power signal is sent on the assignment channel when users with divergent channel conditions are found, and the low-power signal is not sent on the assignment channel at other times. Otherwise, if both high and low power signals were transmitted on the same channel segment when divergent channel conditions did not exist, the users may be able to detect the high power signal on the assignment channel but may decode noise when they attempt to decode a potential superposed low-power signal.

The use of superposition coding on an acknowledgment channel will now be discussed. In an exemplary OFDM-based system, after a traffic segment is received, the receiver generally sends an acknowledgment, in the acknowledgment channel, to inform the transmitter whether the traffic segment has been correctly received. In particular, in some embodiments, for each downlink traffic segment, there is a corresponding uplink acknowledgment segment, and for each uplink traffic segment, there is a corresponding downlink acknowledgment segment.

Figure 13:
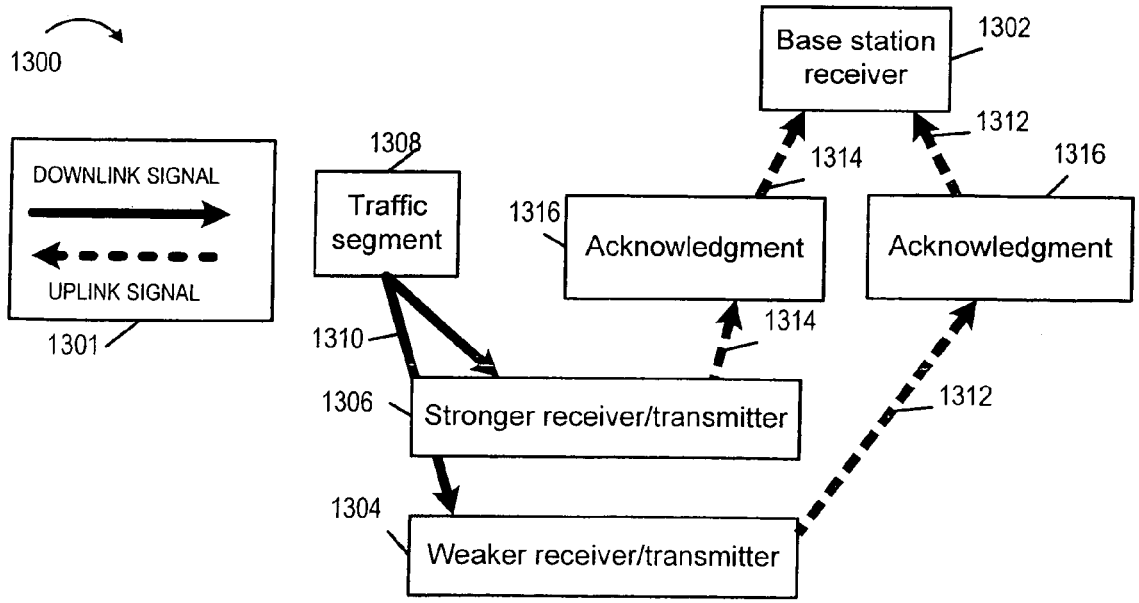
FIG. 13 illustrates superposition coding used in broadcast traffic and multiple-access acknowledgement channels, in accordance with the present invention.

If the downlink traffic segment is assigned to more than one user using superposition coding, then each of those assigned users should send acknowledgments. In accordance with some embodiments of the invention, the uplink acknowledgment channel is implemented as a multiple-access channel using multiple access communication methods. From the above framework of controlled superposition coding in the case when multiple-access communications methods are used, the users superpose their acknowledgments on the same acknowledgment segment. Drawing 1300 of FIG. 13 is used to illustrate superposition coding used in broadcast traffic and superposition coding used in multiple-access acknowledgement channels. FIG. 13 includes a key 1301 illustrating that solid heavy arrows denote downlink signals while dashed heavy arrows denote uplink signals. FIG. 13 includes a base station receiver 1302, a first user 1304, e.g., a wireless terminal, designated as the weaker receiver/transmitter, a second user 1306, e.g., a wireless terminal, designated as the stronger receiver/transmitter. FIG. 13 also includes a downlink traffic segment 1308 and a composite downlink signal 1310 with superposition coding. The downlink composite traffic signal 1310 is transmitted from the base station to both users 1304, 1306 on the same downlink traffic segment 1308. FIG. 13 also includes an uplink acknowledgment signal 1312 from user 1304 to base station receiver 1302 and an uplink acknowledgement signal 1314 from user 1306 to base station receiver 1302. Signal 1312 is transmitted at a low targeted receive power, while signal 1314 is transmitted at a high targeted receive power. The uplink acknowledgement signals 1312 and 1314 are transmitted on the same acknowledgement segment 1316 and are superimposed over the air.

FIG. 13 shows that two users 1304, 1306 receive their downlink traffic segment 1308 with superposition coding. The two users 1304, 1306 then send their acknowledgments 1312, 1314 on the same acknowledgment segment 1316 with different target receive power levels. In one embodiment of the invention, the user, who is identified as the stronger receiver of the traffic segment (receives less protected information), is automatically considered the stronger transmitter of the acknowledgment segment, and thus sends its acknowledgment targeting a higher receive power. In FIG. 13, user 1306 is identified as the stronger receiver of the traffic segment 1308 and is considered the stronger transmitter. User 1306 first decodes and removes the better protected signal meant for the weaker user 1304 and then decodes the data intended for user 1306. Meanwhile, the user, who is identified as the weaker receiver of the traffic segment, is automatically considered the weaker transmitter of the acknowledgment segment, and thus sends its acknowledgment targeting a lower receive power. In FIG. 13, user 1304 is identified as the weaker receiver of the traffic segment 1308 and is considered the weaker transmitter.

Figure 14:
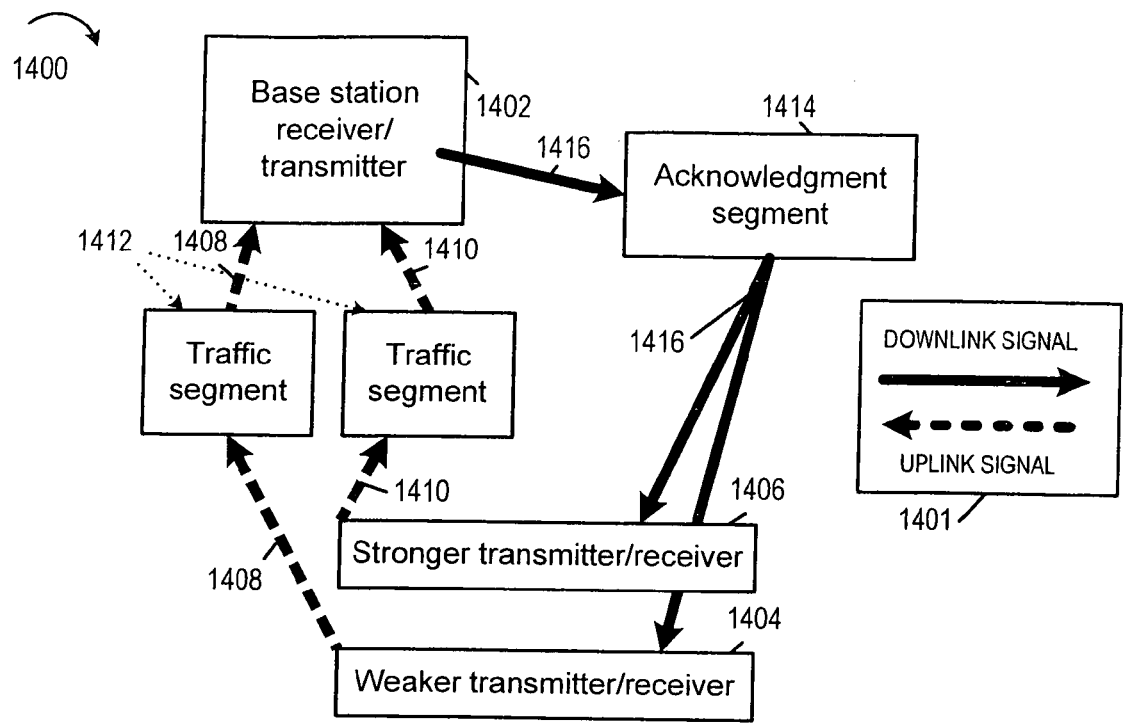
FIG. 14 illustrates superposition coding used in multiple-access traffic and broadcast acknowledgement channels, in accordance with the present invention.

If the uplink traffic segment is assigned to more than one user using superposition coding, then the base station needs to send acknowledgments to multiple users. In accordance with the invention, the downlink acknowledgment channel is treated as a broadcast channel. From the above framework of controlled superposition coding in a broadcast channel, the base station superposes the acknowledgments on the same acknowledgment segment. FIG. 14 shows exemplary superposition coding used in multiple-access traffic channels and exemplary superposition coding used in broadcast acknowledgement channels. FIG. 14 includes a key 1401 illustrating that solid heavy arrows denote downlink signals while dashed heavy arrows denote uplink signals. Drawing 1400 of FIG. 14 includes a base station receiver/transmitter 1402, a first user 1404, e.g., a wireless terminal, designated the weaker transmitter/receiver, and a second user 1406, e.g., a wireless terminal, designated the stronger transmitter/receiver. User 1404 transmits its uplink traffic signal 1408 at a targeted low receive power, while user 1406 transmits its uplink traffic signal 1410 at a high targeted receive power. FIG. 14 shows that two users 1404, 1406 transmit their uplink traffic signals 1408, 1410 on the same traffic segment 1412, and the two signals are superposed over the air. The base station 1402 then sends two acknowledgments in a composite downlink acknowledgement signal 1416 on the same acknowledgment segment 1414 with different transmit power levels for each acknowledgement. In one embodiment of the invention, the user, who is identified as the stronger transmitter of the traffic segment 1412, is automatically considered the stronger receiver of the acknowledgment segment 1414, and thus the base station sends its acknowledgment at low transmit power (less protected). In FIG. 14, user 1406 is identified as the stronger transmitter and thus base station 1402 sends the acknowledgement signal for user 1406 at low transmit power. User 1406 receives signal 1416 and first decodes and removes the better protected signal meant for the weaker user 1404 and then decodes its own acknowledgement signal. Meanwhile, the user, who is identified as the weaker transmitter of the traffic segment 1408, is automatically considered the weaker receiver of the acknowledgment segment 1414, and thus the base station 1402 sends its acknowledgment at high transmit power (more protected). In FIG. 14, user 1404 is identified as the weaker transmitter and thus base station 1402 sends the acknowledgement signal for user 1404 at high transmit power.

An embodiment of the invention using a superposed common control channel shall now be described. In some embodiments of the invention, controlled superposition coding is used to reduce the transmit power level on common control channels used in multi-user communication systems. Common control channels are often used to send control information to every user in the system. As a result, they are normally transmitted at a high transmit power in order to reach the worst-case user. This embodiment will be described in the context of a cellular wireless communication system, but is applicable more generally. This exemplary embodiment assumes a common control channel that is transmitted by the base station on the downlink and monitored by wireless terminal users, e.g., each of mobile users in a cell. In accordance with the invention, the control information is partitioned into two groups. The first group is referred to as 'regular information', which is intended for mainstream users. The set of mainstream users are those mobile users with reasonable downlink channel conditions e.g., reasonable downlink SNR. The second group is referred to as 'protected information', which is intended to be received by most or all of the mobile users in the system, i.e. not only mainstream users but also weaker users, which have poor downlink SNR. In accordance with the invention, the protected control information is transmitted at high power per bit, which enables it to be received robustly by some or all of the weak users in the system. The regular information is then superposed on the protected information at nominal power per bit. The weak users may not be able to decode all the information but should be able to decode the protected information from the superposed signal, while the mainstream users will be able to decode both the protected and the regular information.

Figure 15:
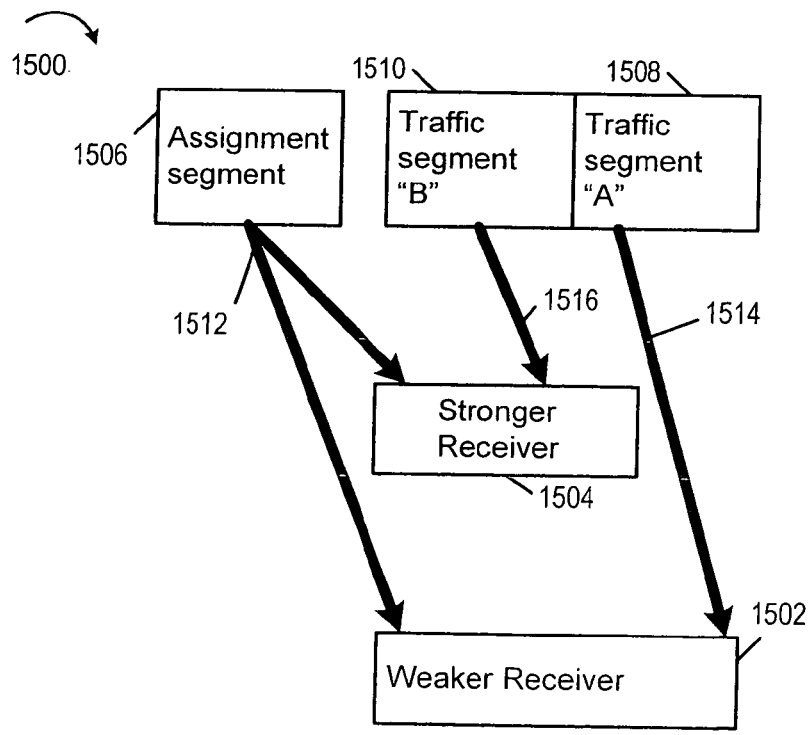
FIG. 15 illustrates an exemplary embodiment of the present invention using superposition coding on a common control channel.

An application of this embodiment is illustrated in FIG. 15. FIG. 15 is a drawing 1500 illustrating the application of superposition coding to a common control channel. FIG. 15 includes a first user 1502, e.g., a wireless terminal, designated the weaker receiver, and a second user 1504, e.g., a wireless terminal, designated the stronger receiver. FIG. 15 also includes an assignment segment 1506, a composite assignment signal with superposition coding 1512, a downlink traffic segment "A" 1508, and a downlink traffic segment "B" 1510. Downlink traffic segment "A" is intended for the weaker receiver 1502, while downlink traffic segment "B" is intended for the stronger receiver 1504.

As described, there are two traffic segments, A 1508 and B 1510. The assignment information of those two traffic segments is sent in a single assignment segment 1506 with superposition coding. Specifically, the assignment information for segment A is treated as protected information and that for segment B is treated as regular information. The mainstream users, e.g., user 1504 can decode both assignments and thus be scheduled in any of the traffic segments 1508, 1510. In this example, stronger receiver 1504 first decodes and removes the better protected signal meant for the weaker receiver 1502 and then decodes its assignment. On the other hand, the weak users, e.g., 1502 can only decode the assignment for segment A 1508 and thus be scheduled only in segment A 1508. It is important to note that superposition coding on the assignment channel is not necessarily tied to superposition coding on the corresponding traffic segments in this example. Traffic segment "A" and traffic segment "B" are distinct traffic segments and signals 1514 and 1516 are distinct signals and are not superposed. Superposition coding on a common control channel is a valuable practical technique in its own right, and may result in power savings as well as increased robustness.

Figure 16:
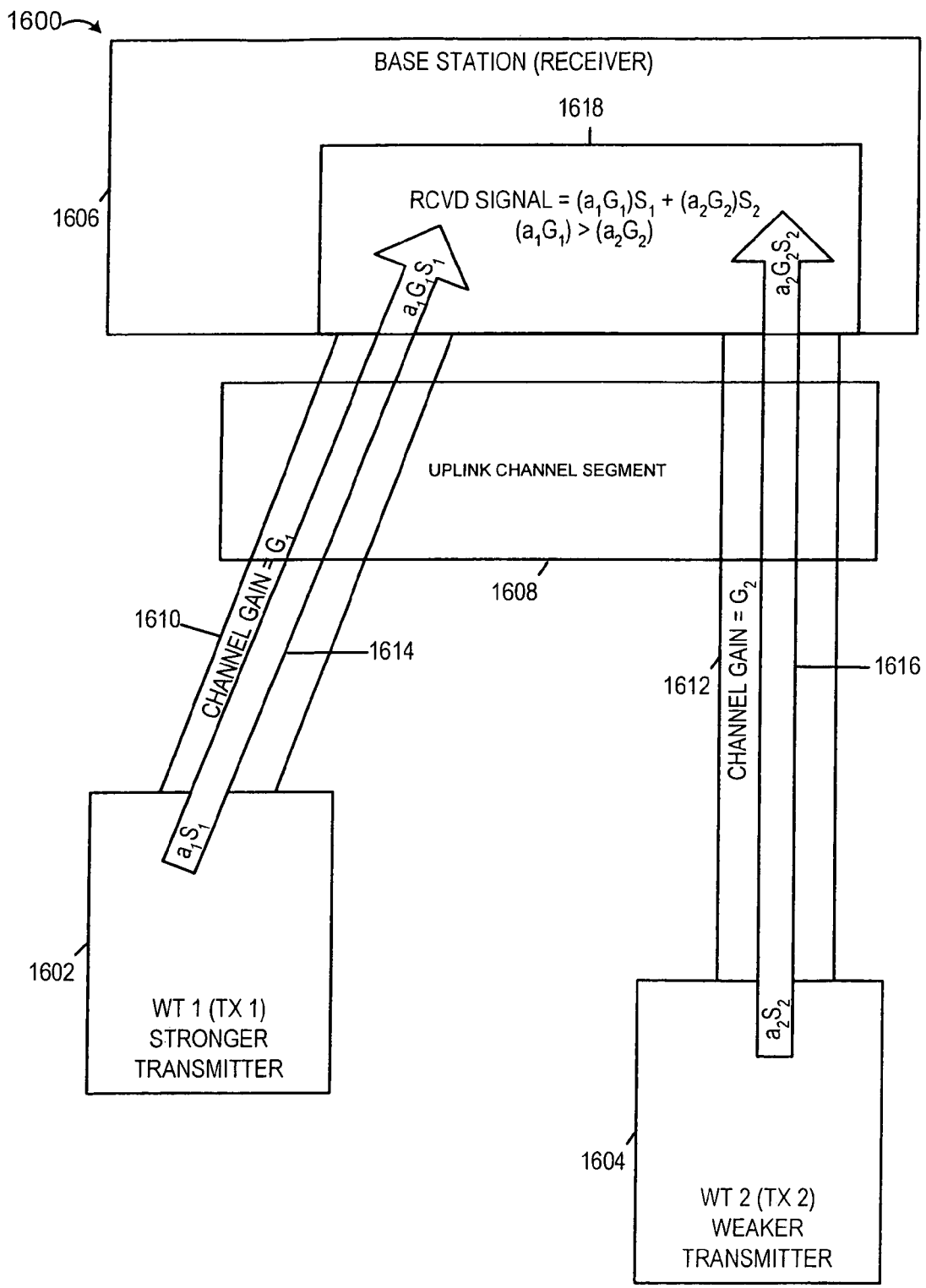
FIG. 16 illustrates exemplary uplink signals on the same channel segment and is used to illustrate an exemplary embodiment of received power targets, in accordance with the present invention.

FIG. 16 is a drawing 1600 including exemplary uplink signals on the same uplink channel segment, and is used to illustrate the concept of targeted received power in accordance with an embodiment of the invention. FIG. 16 includes a two exemplary wireless terminals implemented in accordance with the invention, WT 1 1602, WT 2 1604, and an exemplary base station 1606, implemented in accordance with the invention. The channel gain between WT1 1602 and BS 1606 is $G_1$ 1610 and is known to both WT1 1602 and BS 1606, e.g., by measurements of pilots signals and a feedback channel quality report. The channel gain between WT2 1604 and BS 1606 is $G_2$ 1612 is known to both BS 1606 and WT2 1604, e.g., by measurements of pilots signals and a feedback channel quality report. Assume that both WT1 1602 and WT 2 1604 are transmitting using the same data rate, modulation, coding scheme, and coding rate. WT 1 1602 has been designated as the stronger transmitter by base station 1606 for uplink channel segment 1608, while WT 2 1604 has been designated as the weaker transmitter by base station 1606 for uplink channel segment 1608.

WT1 1602 transmits uplink signal 1614 to the BS 1606. Uplink signal 1614 includes the nominal power signal $S_1$ including WT1 uplink information and has been scaled by a transmission gain value $a_1$. Signal 1614 is transmitted from WT1 1602 as $a_1 S_1$; however, due to the channel losses, the signal is received by the base station's receiver as $a_1 G_1 S_1$ (a reduced level). As, previously stated, WT1 1602 knows the channel value of $G_1$. WT1 1602 has pre-adjusted the value of $a_1$ to achieve a high received power target represented by $a_1 G_1$.

The channel gain between WT2 1604 and BS 1606 is $G_2$ 1612 is known to both BS 1606 and WT2 1604, e.g., by measurements of pilots signals and a feedback channel quality report. WT2 1604 transmits uplink signal 1616 to the BS 1606. Uplink signal 1616 includes nominal power signal $S_2$ including WT2 uplink information and has been scaled by a transmission gain value $a_2$. Signal 1616 leaves the WT as $a_2 S_2$; however, due to the channel losses, the signal is received by the base station's receiver as $a_2 G_2 S_2$ (a reduced level). As, previously stated, WT2 1604 knows the channel value of $G_2$. WT2 has pre-adjusted the value of $a_2$ to achieve a low received power target represented by $a_2 G_2$. Since the two signals 1614 and 1616 were transmitted on the same uplink channel segment 1608, the signals superposed in the air and were received by base station 1606 as a combined signal $(a_1 G_1) S_1 + (a_2 G_2) S_2$ 1618.

The two received power targets were chosen such that the high power target, represented by $a_1 G_1$ is greater, e.g., much greater, than the low power target represented by $a_2 G_2$. By achieving different power target levels at BS 1606, the BS can differentiate between the two signals from the two independent devices (WT1 1602, WT2 1604) and extract the information from signals $S_1$ and $S_2$. Note that $a_1$ can be less than $a_2$ depending upon the channel gains.

Figure 17:
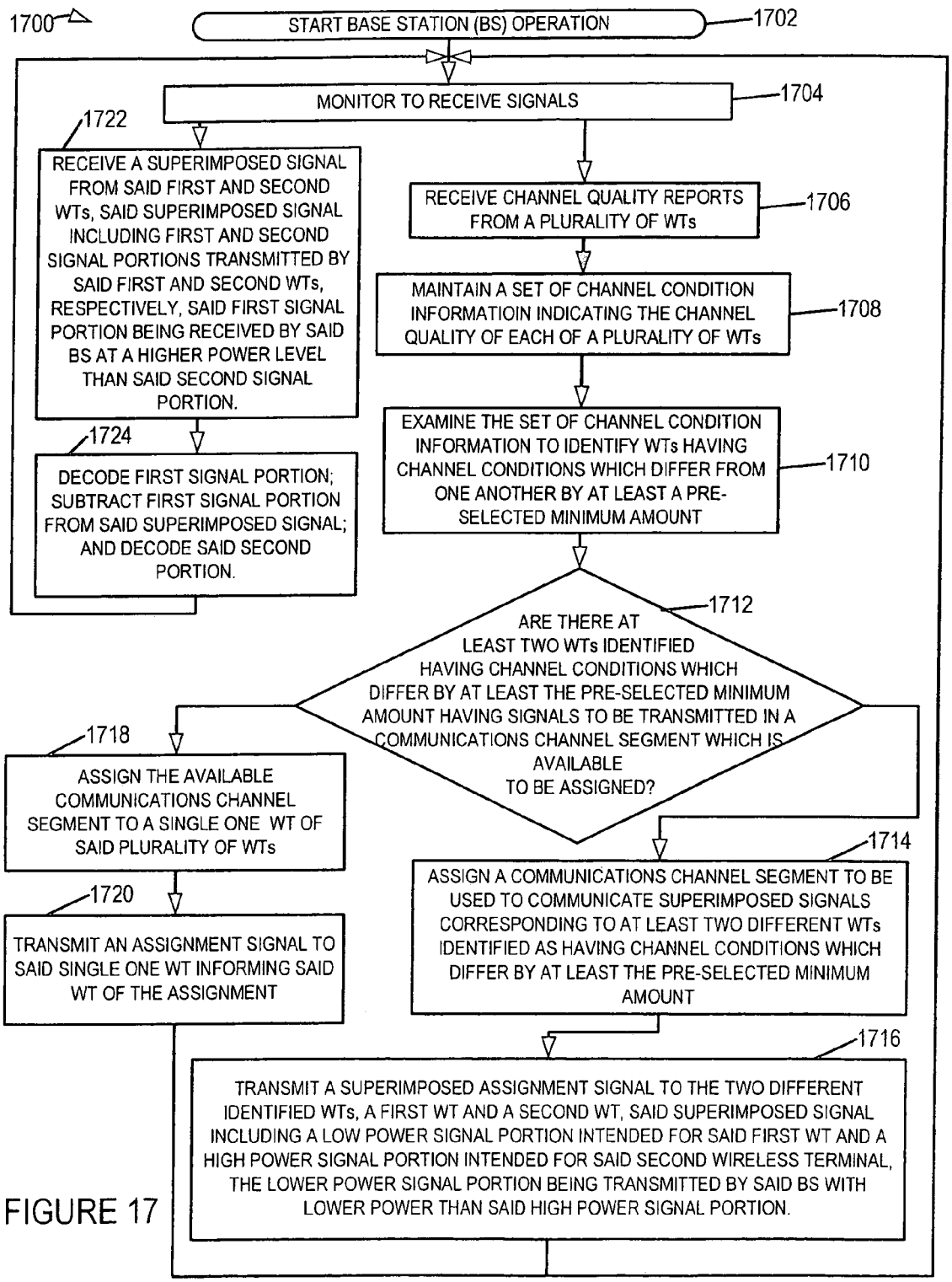
FIG. 17 is a flow chart illustrating the steps of an exemplary method implemented by a base station in one exemplary embodiment.

FIG. 17 is a flowchart 1700 of an exemplary method of operating a base station (BS) in accordance with the present invention. The exemplary method of flowchart 1700 uses controlled superposition in accordance with the present invention. In step 1702, base station operation starts, e.g., the base station is powered on and initialized. Operation proceeds from step 1702 to step 1704. In step 1704, the BS monitors to receive signals, e.g., uplink signals from WTs. Operation proceeds from step 1704 to steps 1706 and 1722.

In step 1706, the BS receives channel quality reports from a plurality of WTs. In step 1708, the BS maintains a set of channel condition information indicating the channel quality of each of a plurality of WTs. The maintained set of channel condition information includes, e.g., separate channel signal to noise ratio information for each of the plurality of WTs. Operation proceeds from step 1708 to step 1710. In step 1710, the BS examines the set of channel condition information to identify WTs having channel conditions which differ from one another by at least a pre-selected minimum amount, e.g., 3 dB or 5 dB or 10 dB. Then, in step 1712, the BS determines if there are at least two WTs identified as having channel conditions which differ by at least the pre-selected minimum amount, that have signals to be transmitted in a communications channel segment which is available to be assigned.

If it is determined that at least two identified WTs having channel conditions differing by at least the pre-selected minimum have signals to be transmitted in an available channel segment, operation proceeds from step 1712 to step 1714. In step 1714, the BS assigns a communications channel segment to be used to communicate superimposed signals corresponding to at least two different WTs identified as having channel conditions which differ by at least the pre-selected minimum amount, e.g., a first WT which has a better channel quality (by at least the pre-selected minimum amount) than a second WT. The assigned communication channel segment may be, e.g., a downlink channel segment that is an assignment channel segment used to communicate uplink communications channel segment assignments, e.g, uplink traffic channel segment assignments, to WTs.

Operation proceeds from step 1714 to step 1716. In step 1716, the base station transmits a superimposed signal to the two different identified WTs, the first WT, and the second WT, e.g., an assignment channel segment corresponding to the communications channel segment being assigned, said superimposed signal including a low power signal portion intended for said first WT and a high power signal portion intended for said second wireless terminal, the lower power signal portion being transmitted by said BS with lower power than said high power signal portion. Operation proceeds from step 1716 to step 1704, in which the base station monitors for additional signals.

If it is determined in step 1712, that there are not at least two WTs identified having channel conditions which differ by at least the pre-selected minimum amount having signals to be transmitted in a communications channel segment which is available to be assigned, then operation proceeds to step 1718. In step 1718, the BS assigns the available communications channel segment to a single one of said plurality of WTs. Operation proceeds from step 1718 to step 1720. In step 1720, the base station transmits an assignment signal to said single one WT. Operation proceeds from step 1720 to step 1704, in which the BS continues to monitor for signals.

From step 1704, operation also proceeds to step 1722. In step 1722, the base station receives a superimposed signal from said first and second WTs, said superimposed signal including first and second signal portions transmitted by said first and second WTs, respectively, said first signal portion being received by said BS at a higher power level than said second signal portion. Operation proceeds from step 1722 to step 1724. In step 1724, the BS decodes first signal portion; subtracts the first signal portion from the said superimposed signal; and then decodes said second signal portion. Operation proceeds from step 1724 to step 1704, in which the base station continues to monitor to receive signals.

Figure 18A:
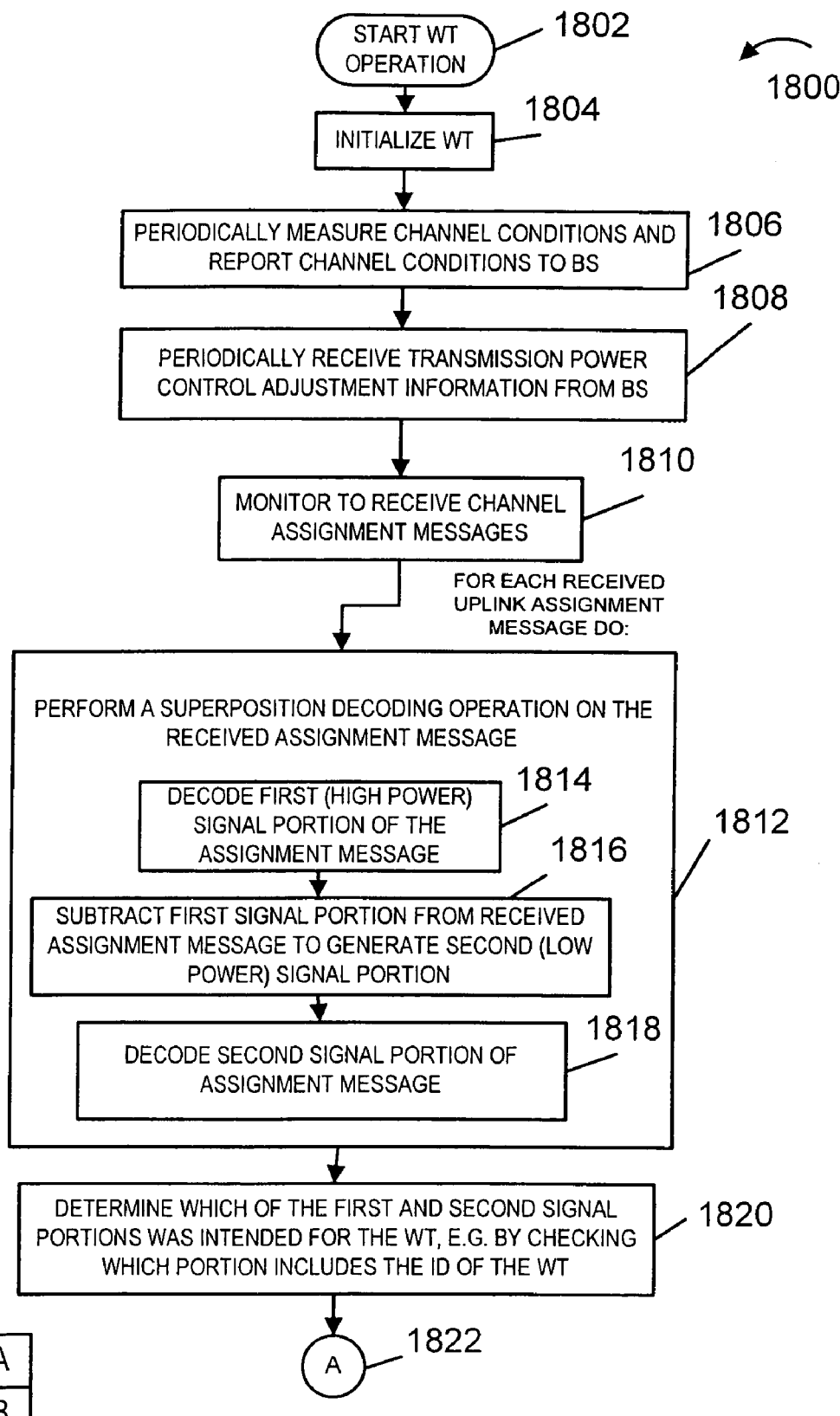
FIG. 18 is a flow chart illustrating the steps of an exemplary method implemented by a wireless terminal in one exemplary embodiment.
Figure 18B:
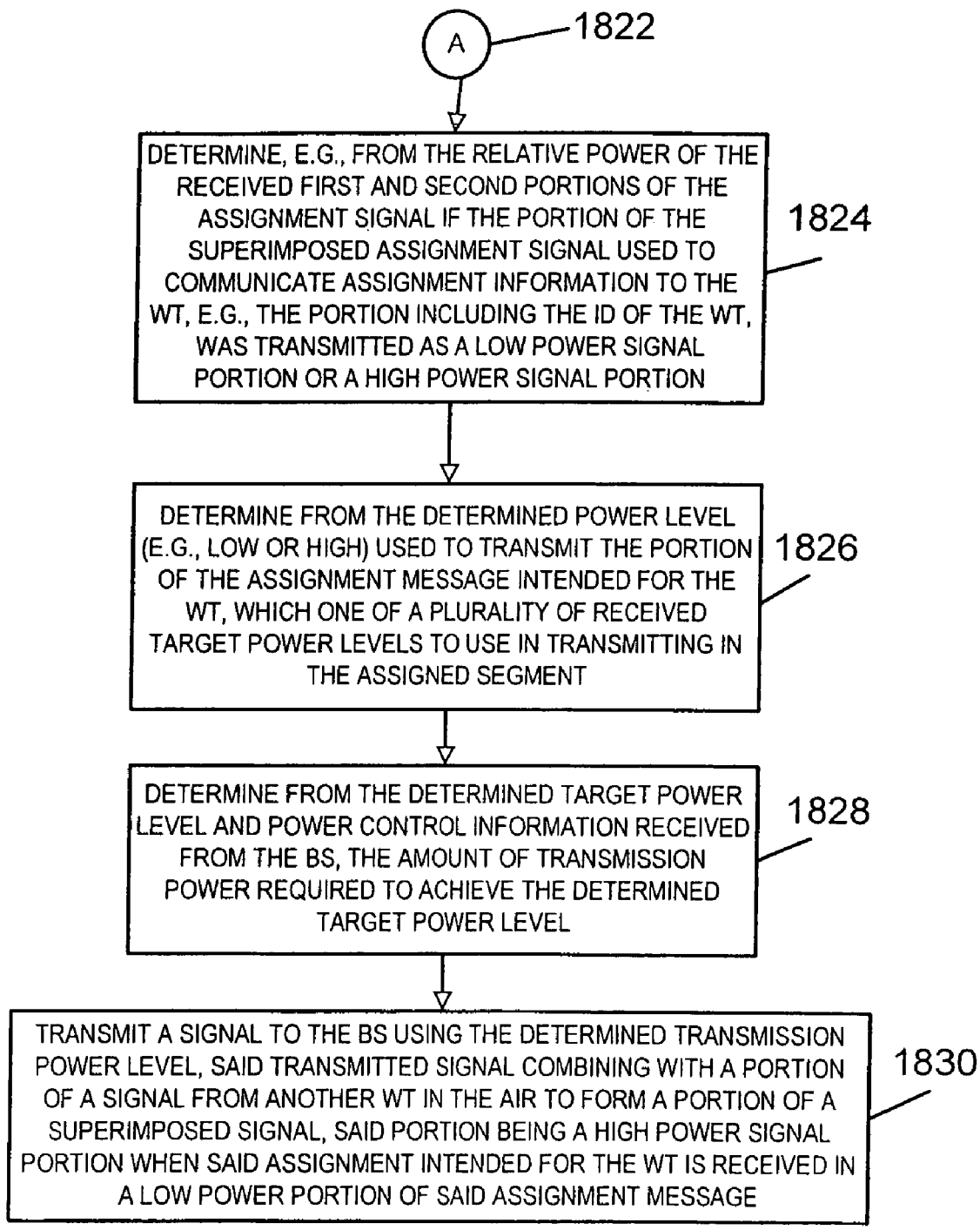

FIG. 18 illustrates the steps performed by a WT in accordance with one exemplary embodiment of the invention where superimposed uplink channel assignment messages are used to assign uplink traffic channel segments to WTs. The assignment message intended for a particular WT includes the WT's particular terminal identifier. The transmission of the assignment message (e.g., terminal ID) to the WT with the better channel condition is on the low power portion of the superimposed assignment message signal while the assignment to the WT with the poorer channel condition is on the high power portion of the superimposed assignment message signal.

The method 1800 begins in start step 1802. Next, in step 1804 the WT is initialized, e.g., as part of a power on operation. Once in an active state, in step 1806, the WT periodically measures the channel conditions and reports the channel conditions to the BS with which it is interacting. The WT receives transmission power control adjustment information from the BS in step 1808 on a periodic basis. Based on this information the WT can predict what the received power will be at the BS for a particular transmission power level. Thus, the BS power control information allows the WT to determine a transmission power level required to meet a target received power level. The WT stores information, e.g., a table including different gain coefficients that can be used to achieve different received power levels, which can be used in combination with the WT feedback information which indicates the transmission power required to achieve a particular reference level. The gain coefficients can be used as offsets from the gain required to achieve the particular reference level thereby resulting in the received power level associated with the gain coefficient when used to adjust the transmission power level in combination with the received power control feedback information.

Monitoring for channel assignment messages occurs in step 1810. Steps 1806, 1808 and 1810 are performed on an ongoing basis while the WT operates in an active state. For each assignment message received in step 1810 operation proceeds to step 1812. In step 1812, a superposition decoding operation is performed on the received assignment message which is a superimposed signal including a first signal part and a second signal part where the first and second signal parts are transmitted at different power levels with the first signal part being the higher power part. The decoding step 1812 includes substep 1814 in which the first signal portion, e.g., the high power portion, is decoded. Then in step 1816 the first signal portion is substracted from the received assignment message to produce the second (low power) signal portion which is decoded in substep 1818. If the WT has poor channel conditions, it may only be able to decode the first, high power, signal portion, for this reason the BS uses the high power signal portion to communicate assignment information to the WT having the poorer communications channel.

After the superposition decoding is completed, operation proceeds to step 1820 where the decoding result is examined to determine which one of the first and second signal portions was intended for the WT, e.g., the WT checks to determine which portion includes its particular WT identifier. Assuming the WT has the better channel conditions of the WTs to which the segment is being assigned, the WT will detect its ID in the low power signal portion of the transmitted signal.

Operation proceeds from step 1820 to step 1824 via connecting node A 1822. In step 1824 the WT determines if the portion of the assignment message which was intended for the WT was the low or high power portion of the received assignment message. Next, in step 1826, the WT determines from the power level information determined in step 1824 which one of a plurality of received target power levels to use in transmitting information to the BS in the assigned segment corresponding to the received assignment message. From the determined received target power level, the stored gain coefficient information corresponding to the determined received target power level and the power control feedback information, the WT determines in step 1828 the transmission power level required to achieve the determined received target power level at the BS. Next, in step 1830 the WT transmits a signal to the BS using the determined transmission power level in the assigned uplink channel segment. The transmitted signal will combine with a portion of a signal from another WT in the air to form a portion of a superimposed signal that will be received by the BS. The transmitted signal will be a high power signal portion of the superimposed signal received by the BS as a result of the determined transmission power level in cases where the assignment message intended for the WT was determined to be a low power portion of the assignment message. The transmitted signal will be a low power signal portion of the superimposed signal received by the BS as a result of the determined transmission power level in cases where the assignment message intended for the WT was determined to be a high power portion of the assignment message. With the transmission of the information to the BS in the assigned uplink channel segment complete, processing of a received uplink assignment message stops with processing of other assignment messages occurring as they are received.

Processing of downlink channel assignment messages is not specifically shown in FIG. 18, but such assignment messages may be transmitted using superposition coding in accordance with the invention.

While described in the context of an OFDM system, the methods and apparatus of the present invention, are applicable to a wide range of communications systems including many non-OFDM and/or non-cellular systems.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A communications method for use in a communications system including a base station and a plurality of wireless terminals, a different communications channel existing between each wireless terminal in said plurality of wireless terminals and said base station, the communications channel existing between each particular wireless terminal and the base station having a quality which is the channel quality for the particular wireless terminal, the method comprising:

operating the base station to:
  i) maintain a set of channel condition information indicating the channel quality of each of said plurality of wireless terminals;
  ii) examine the set of channel condition information to identify wireless terminals having channel conditions which differ from one another by at least a pre-selected minimum amount; and
  iii) assign a communications channel segment to be used to communicate superimposed signals corresponding to at least two different wireless terminals identified as having channel conditions which differ by at least said pre-selected minimum amount.

2. The method of claim 1, further comprising:
operating the base station to repeat said steps of maintaining, examining and assigning.

3. The method of claim 1, further comprising:
operating the base station to repeat said steps of maintaining and examining; and wherein when said examining step fails to identify at least two wireless terminals having channel conditions which differ by the pre-selected minimum amount having signals to be transmitted in a communications channel segment which is available to be assigned, operating said base station to:
assign the available communications channel segment to a single one of said plurality of wireless terminals.

4. A communications method for use in a communications system including a base station and a plurality of wireless terminals, a different communications channel existing between each wireless terminal in said plurality of wireless terminals and said base station, the communications channel existing between each particular wireless terminal and the base station having a quality which is the channel quality for the particular wireless terminal, the method comprising:
operating the base station to:
i) maintain a set of channel condition information indicating the channel quality of each of said plurality of wireless terminals;
ii) examine the set of channel condition information to identify wireless terminals having channel conditions which differ from one another by at least a pre-selected minimum amount; and
iii) assign a communications channel segment to be used to communicate superimposed signals corresponding to at least two different wireless terminals identified as having channel conditions which differ by at least said pre-selected minimum amount;
wherein the maintained set of channel condition information includes channel signal to noise ratio information;
wherein said at least two different wireless terminals include a first and a second wireless terminal; and
wherein the minimum preselected amount by which the channel conditions of the first and second wireless terminals differ is 3 dB.

5. A communications method for use in a communications system including a base station and a plurality of wireless terminals, a different communications channel existing between each wireless terminal in said plurality of wireless terminals and said base station, the communications channel existing between each particular wireless terminal and the base station having a quality which is the channel quality for the particular wireless terminal, the method comprising:
operating the base station to:
i) maintain a set of channel condition information indicating the channel quality of each of said plurality of wireless terminals;
ii) examine the set of channel condition information to identify wireless terminals having channel conditions which differ from one another by at least a pre-selected minimum amount; and
iii) assign a communications channel segment to be used to communicate superimposed signals corresponding to at least two different wireless terminals identified as having channel conditions which differ by at least said pre-selected minimum amount; and
operating the base station to transmit a first superimposed signal to the first and second wireless terminals in said assigned communication channel segment, said first superimposed signal including a low power signal portion intended for said first wireless terminal and a high power signal portion intended for said second wireless terminal, the low power signal portion being transmitted by said base station with lower power than said high power signal portion or having less coding protection than said high power signal portion;
wherein said at least two different wireless terminals includes a first wireless terminal and a second wireless terminal;
wherein said assigned communications channel segment is a segment of a downlink channel; and
wherein the first wireless terminal has a better channel quality than said second wireless terminal.

6. The communications method of claim 5, wherein said assigned communications channel segment is a segment of an assignment channel used to communicate communications channel segment assignments to wireless terminals.

7. The communications method of claim 6, further comprising:
operating said base station to:
receive a second superimposed signal from said first and second wireless terminals, said received second superimposed signal including first and second signal portions transmitted by said first and second wireless terminals, respectively, said first signal portion being received by said base station at a higher power level than said second signal portion.

8. The communications method of claim 7, further comprising:
operating said base station to:
decode said first signal portion;
subtract said first signal portion from said second superimposed signal; and
decode said second signal portion.

9. The communications method of claim 7, further comprising:
operating the first wireless terminal to determine which one of a plurality of received target power levels to use in determining the transmission power to use to transmit said first signal portion from said first superimposed signal transmitted to said first and second wireless terminals in said segment of an assignment channel.

10. The communications method of claim 9, wherein operating the first wireless terminal to determine which one of a plurality of received target power levels to use includes:
determining whether the portion of the first superimposed signal used to communicate uplink channel assignment information to the first wireless terminal was transmitted as a low power signal portion or a high power signal portion.

11. A base station for use in a communications system including a plurality of wireless terminals, a different communications channel existing between each wireless terminal in said plurality of wireless terminals and said base station, the communications channel existing between each particular wireless terminal and the base station having a quality which is the channel quality for the particular wireless terminal, the base station comprising:
a set of channel condition information indicating the channel quality of each of said plurality of wireless terminals;
means for examining the set of channel condition information to identify wireless terminals having channel conditions which differ from one another by a pre-selected minimum amount; and
means for assigning a communications channel segment to be used to communicate superimposed signals corresponding to a least two different wireless terminals identified as having channel conditions which differ by at least said pre-selected minimum amount.

12. The base station of claim 11, further comprising:
means for assigning an available communications channel segment to a single one of said plurality of wireless terminals when said examining means fails to identify at least two wireless terminals having channel conditions which differ by the pre-selected minimum amount which have signals to be transmitted in the communications channel segment which is available to be assigned.

13. A base station for use in a communications system including a plurality of wireless terminals, a different communications channel existing between each wireless terminal in said plurality of wireless terminals and said base station, the communications channel existing between each particular wireless terminal and the base station having a quality which is the channel quality for the particular wireless terminal, the base station comprising:
 a set of channel condition information indicating the channel quality of each of said plurality of wireless terminals;
 means for examining the set of channel condition information to identify wireless terminals having channel conditions which differ from one another by a pre-selected minimum amount; and
 means for assigning a communications channel segment to be used to communicate superimposed signals corresponding to a least two different wireless terminals identified as having channel conditions which differ by at least said pre-selected minimum amount;
 wherein said at least two different wireless terminals includes a first and a second wireless terminal;
 wherein the maintained set of channel condition information includes channel signal to noise ratio information; and
 wherein the minimum pre-selected amount by which the channel conditions of a first and second wireless terminals differ is 3 dB.

14. A base station for use in a communications system including a plurality of wireless terminals, a different communications channel existing between each wireless terminal in said plurality of wireless terminals and said base station, the communications channel existing between each particular wireless terminal and the base station having a quality which is the channel quality for the particular wireless terminal, the base station comprising:
 a set of channel condition information indicating the channel quality of each of said plurality of wireless terminals;
 means for examining the set of channel condition information to identify wireless terminals having channel conditions which differ from one another by a pre-selected minimum amount; and
 means for assigning a communications channel segment to be used to communicate superimposed signals corresponding to a least two different wireless terminals identified as having channel conditions which differ by at least said pre-selected minimum amount;
 means for assigning an available communications channel segment to a single one of said plurality of wireless terminals when said examining means fails to identify at least two wireless terminals having channel conditions which differ by the preselected minimum amount which have signals to be transmitted in the communications channel segment which is available to be assigned; and
 a receiver for receiving a superimposed signal from said first and second wireless terminals, said received superimposed signal including first and second signal portions transmitted by said first and second wireless terminals, respectively, said first signal portion being received by said base station at a higher power level than said second signal portion, said first wireless terminal having a better channel condition than said second wireless terminal.

15. The base station of claim 14, further comprising:
 a superposition decoder for decoding said first and second signal portions of the received superimposed signal.

16. The base station of claim 15, wherein said superposition decoder includes:
 a decoder device for decoding said first signal portion;
 a subtracter for subtracting said first signal portion from said superimposed signal to produce said second signal portion; and
 a second decoder device for decoding said second signal portion.

17. A communications method for use in a communications system including a base station and a plurality of wireless terminals, a different communications channel existing between each wireless terminal in said plurality of wireless terminals and said base station, the communications channel existing between each particular wireless terminal and the base station having a quality which is the channel quality for the particular wireless terminal, the method comprising:
 operating a first wireless terminal having a first channel quality to transmit a first portion of a superimposed communications signal to said base station; and
 operating a second wireless terminal having a second channel quality to transmit a second portion of said superimposed communications signal to said base station, the first and second channel qualities being different by at least a first pre-selected amount, said first and second signal portions combining in the air during transmission to the base station to form said superimposed communications signal.

18. The communications method of claim 17,
 wherein the at least a first minimum pre-selected amount by which the channel quality of the first and second wireless terminals differ is 3 dB.

19. The communications method of claim 17, further comprising:
 operating the first and second wireless terminals to receive, prior to transmission of said first and second superimposed signal portions, a superimposed assignment signal including a low power signal portion intended for said first wireless terminal and a high power signal portion intended for said second wireless terminal, the lower power signal portion being transmitted by said base station with lower power than said high power signal portion, said first wireless terminal having a better channel quality than said second wireless terminal, said superimposed assignment signal assigning an uplink communications channel segment.

20. The communications method of claim 19, wherein the first and the second signal portions transmitted by said first and second wireless terminals, respectively, are transmitted with power levels that cause said first signal portion to be received by said base station at a higher power level than said second signal portion.

21. The communications method of claim 20, further comprising:
 operating the first wireless terminal to determine which one of a plurality of received target power levels to use in determining the transmission power to use to transmit said first signal portion from said superimposed assignment signal.

22. The communications method of claim 21, wherein operating the first wireless terminal to determine which one of a plurality of received target power levels to use includes:
  determining whether the superimposed signal portion used to communicate uplink channel assignment information to the first wireless terminal was transmitted as a low power signal portion or a high power signal portion.

23. A wireless terminal including:
  receiver means for receiving a superimposed assignment signal including a first signal portion and a second signal portion one of said signal portions being intended for said wireless terminal with the other one of said signal portions being intended for another wireless terminal, the first signal portion being received with at a lower power level than said second signal portion;
  superposition decoder means for decoding said first and second signal portions;
  means for determining from information included in one of said first and second signal portions which portion is intended for said wireless terminal; and
  a transmitter for transmitting signals in uplink communications channel segments to which received superimposed assignment signals intended for said wireless terminal correspond.

24. The wireless terminal of claim 23, further comprising:
  stored received target level power information for a plurality of different received power target levels; and
  means for determining which one of the plurality of received target power levels to use when transmitting a signal in a particular uplink communications channel segment from a received superimposed assignment signal corresponding to the particular uplink communications channel segment.

25. The wireless terminal of claim 24, wherein said means for determining determines whether the superimposed signal portion used to communicate uplink channel assignment information to the wireless terminal was transmitted as a low power signal portion or a high power signal portion.

26. A communications method for use in a communications system including a base station and a plurality of wireless terminals, a different communications channel existing between each wireless terminal in said plurality of wireless terminals and said base station, the communications channel existing between each particular wireless terminal and the base station having a quality which is the communications channel quality for the particular wireless terminal, signals transmitted from the wireless terminals to the base station combining in the communications channel, the method comprising:
  operating the base station to:
    assign an uplink communications channel segment to be used simultaneously by a first and second device;
    receive a composite signal from said uplink communications channel segment, said composite signal including a first signal transmitted by said first device and a second signal transmitted by said second device; and
    perform a superposition decoding operation on the received composite signal to decode the first and second signals included in said composite signal.

27. The communications method of claim 26, wherein operating the base station to assign an uplink communications channel segment includes operating the base station to:
  select based on communications channel quality information, a first wireless terminal and a second wireless terminal, the first and second wireless terminals having different wireless terminal communications channel qualities, to share an uplink traffic segment; and
  wherein the method further comprises operating the base station to:
    transmit to the selected first and second wireless terminals information indicating the assigned traffic channel segment and which one of the first and second wireless terminals should transmit signals to be received by said base station at a higher power level.

28. The method of claim 27, wherein the one of the first and second wireless terminals having the better channel conditions is to be received at the base station at the higher power level, the method further comprising:
  operating the first wireless terminal to transmit to the base station in the assigned traffic channel segment a first signal portion; and
  operating the second wireless terminal to transmit to the base station in the assigned traffic channel segment a second signal portion, the first and second signal portions superimposing during transmission to said base station.

29. The method of claim 28, wherein the first wireless terminal transmits the first signal portion using less power than the power used by said second wireless terminal to transmit said second signal portion but the first signal portion is received by said base station with a power level that is higher than the power level of the second signal portion received by said base station.

30. The method of claim 29,
  wherein said at least two different wireless terminals includes a first wireless terminal and a second wireless terminal;
  wherein said communications channel segment to be assigned is a segment of a downlink channel;
  wherein the first wireless terminal has a better channel quality than said second wireless terminal; and
  wherein the base station further comprises:
  means for transmitting a superimposed signal to the first and second wireless terminals in said assigned communication channel segment, said superimposed signal including a low power signal portion intended for said first wireless terminal and a high power signal portion intended for said second wireless terminal, the lower power signal portion being transmitted by said base station with lower power than said high power signal portion.

31. A computer readable medium encoded with computer executable instructions for controlling a base station to implement a communications method in a communications system including the base station and a plurality of wireless terminals, a different communications channel existing between each wireless terminal in said plurality of wireless terminals and said base station, the communications channel existing between each particular wireless terminal and the base station having a quality which is the channel quality for the particular wireless terminal, the communications method comprising:
  i) maintaining a set of channel condition information indicating the channel quality of each of said plurality of wireless terminals;
  ii) examining the set of channel condition information to identify wireless terminals having channel conditions which differ from one another by at least a pre-selected minimum amount; and
  iii) assigning a communications channel segment to be used to communicate superimposed signals corresponding to at least two different wireless terminals identified as having channel conditions which differ by at least said pre-selected minimum amount.

32. A computer readable medium encoded with computer executable instructions for controlling a base station to implement a communications method in a communications system including the base station and a plurality of wireless terminals, a different communications channel existing between each wireless terminal in said plurality of wireless terminals and said base station, the communications channel existing between each particular wireless terminal and the base station having a quality which is the channel quality for the particular wireless terminal, the communications method comprising:
- i) maintaining a set of channel condition information indicating the channel quality of each of said plurality of wireless terminals;
- ii) examining the set of channel condition information to identify wireless terminals having channel conditions which differ from one another by at least a pre-selected minimum amount; and
- iii) assigning a communications channel segment to be used to communicate superimposed signals corresponding to at least two different wireless terminals identified as having channel conditions which differ by at least said pre-selected minimum amount;
- wherein the maintained set of channel condition information includes channel signal to noise ratio information;
- wherein said at least two different wireless terminals include a first and a second wireless terminal; and
- wherein the minimum pre-selected amount by which the channel conditions of the first and second wireless terminals differ is 3 dB.

33. The computer readable medium of claim 32, wherein the communications method further comprises:
repeating said steps of maintaining, examining and assigning.

34. A device comprising a processor configured to control a base station to implement a communications method in a communications system including the base station and a plurality of wireless terminals, a different communications channel existing between each wireless terminal in said plurality of wireless terminals and said base station, the communications channel existing between each particular wireless terminal and the base station having a quality which is the channel quality for the particular wireless terminal, the communications method comprising:
- i) maintaining a set of channel condition information indicating the channel quality of each of said plurality of wireless terminals;
- ii) examining the set of channel condition information to identify wireless terminals having channel conditions which differ from one another by at least a pro-selected minimum amount; and
- iii) assigning a communications channel segment to be used to communicate superimposed signals corresponding to at least two different wireless terminals identified as having channel conditions which differ by at least said pre-selected minimum amount.

35. A device comprising a processor configured to control a base station to implement a communications method in a communications system including the base station and a plurality of wireless terminals, a different communications channel existing between each wireless terminal in said plurality of wireless terminals and said base station, the communications channel existing between each particular wireless terminal and the base station having a quality which is the channel quality for the particular wireless terminal, the communications method comprising:
- i) maintaining a set of channel condition information indicating the channel quality of each of said plurality of wireless terminals;
- ii) examining the set of channel condition information to identify wireless terminals having channel conditions which differ from one another by at least a preselected minimum amount; and
- iii) assigning a communications channel segment to be used to communicate superimposed signals corresponding to at least two different wireless terminals identified as having channel conditions which differ by at least said pre-selected minimum amount;
- wherein the maintained set of channel condition information includes channel signal to noise ratio information;
- wherein said at least two different wireless terminals include a first and a second wireless terminal; and
- wherein the minimum pre-selected amount by which the channel conditions of the first and second wireless terminals differ is 3 dB.

36. The device of claim 35, wherein the communications method further comprises:
repeating said steps of maintaining, examining and assigning.

37. A base station for use in a communications system including a plurality of wireless terminals, a different communications channel existing between each wireless terminal in said plurality of wireless terminals and said base station, the communications channel existing between each particular wireless terminal and the base station having a quality which is the channel quality for the particular wireless terminal, the base station comprising:
- memory including a set of channel condition information indicating the channel quality of each of said plurality of wireless terminals;
- a channel condition information examination module for examining the set of channel condition information to identify wireless terminals having channel conditions which differ from one another by a pre-selected minimum amount; and
- an assignment module for assigning a communications channel segment to be used to communicate superimposed signals corresponding to a least two different wireless terminals identified as having channel conditions which differ by at least said pre-selected minimum amount.

38. A base station for use in a communications system including a plurality of wireless terminals, a different communications channel existing between each wireless terminal in said plurality of wireless terminals and said base station, the communications channel existing between each particular wireless terminal and the base station having a quality which is the channel quality for the particular wireless terminal, the base station comprising:
- memory including a set of channel condition information indicating the channel quality of each of said plurality of wireless terminals;
- a channel condition information examination module for examining the set of channel condition information to identify wireless terminals having channel conditions which differ from one another by a pre-selected minimum amount; and
- an assignment module for assigning a communications channel segment to be used to communicate superimposed signals corresponding to a least two different wireless terminals identified as having channel conditions which differ by at least said pre-selected minimum amount;

wherein said at least two different wireless terminals includes a first and a second wireless terminal;

wherein the maintained set of channel condition information includes channel signal to noise ratio information; and wherein the minimum pre-selected amount by which the channel conditions of a first and second wireless terminals differ is 3 dB.

39. The base station of claim 38, further comprising:

a receiver for receiving a superimposed signal from said first and second wireless terminals, said received superimposed signal including first and second signal portions transmitted by said first and second wireless terminals, respectively, said first signal portion being received by said base station at a higher power level than said second signal portion, said first wireless terminal having a better channel condition than said second wireless terminal.

40. A wireless terminal including:

a receiver for receiving a superimposed assignment signal including a first signal portion and a second signal portion one of said signal portions being intended for said wireless terminal with the other one of said signal portions being intended for another wireless terminal, the first signal portion being received with at a lower power level than said second signal portion;

a superposition decoder for decoding said first and second signal portions;

a determination module for determining from information included in one of said first and second signal portions which portion is intended for said wireless terminal; and a transmitter for transmitting signals in uplink communications channel segments to which received superimposed assignment signals intended for said wireless terminal correspond.

41. The wireless terminal of claim 40, further comprising:

stored received target level power information for a plurality of different received power target levels; and a target power level determination module for determining which one of the plurality of received target power levels to use when transmitting a signal in a particular uplink communications channel segment from a received superimposed assignment signal corresponding to the particular uplink communications channel segment.

42. A method of operating a wireless terminal comprising:

receiving a superimposed assignment signal including a first signal portion and a second signal portion one of said signal portions being intended for said wireless terminal with the other one of said signal portions being intended for another wireless terminal, the first signal portion being received with at a lower power level than said second signal portion;

decoding said first and second signal portions;

determining from information included in one of said first and second signal portions which portion is intended for said wireless terminal; and transmitting signals in uplink communications channel segments to which received superimposed assignment signals intended for said wireless terminal correspond.

43. The method of claim 42, further comprising:

storing received target level power information for a plurality of different received power target levels; and determining which one of the plurality of received target power levels to use when transmitting a signal in a particular uplink communications channel segment from a received superimposed assignment signal corresponding to the particular uplink communications channel segment.

44. The method of claim 43, wherein said determining includes determining whether the superimposed signal portion used to communicate uplink channel assignment information to the wireless terminal was transmitted as a low power signal portion or a high power signal portion.

45. A computer readable medium encoded with computer executable instructions for controlling a wireless terminal to implement a method, the method comprising:

receiving a superimposed assignment signal including a first signal portion and a second signal portion one of said signal portions being intended for said wireless terminal with the other one of said signal portions being intended for another wireless terminal, the first signal portion being received with at a lower power level than said second signal portion;

decoding said first and second signal portions;

determining from information included in one of said first and second signal portions which portion is intended for said wireless terminal; and transmitting signals in uplink communications channel segments to which received superimposed assignment signals intended for said wireless terminal correspond.

46. The computer readable medium of claim 45, wherein the method, further comprises:

storing received target level power information for a plurality of different received power target levels; and determining which one of the plurality of received target power levels to use when transmitting a signal in a particular uplink communications channel segment from a received superimposed assignment signal corresponding to the particular uplink communications channel segment.

47. The computer readable medium of claim 46 wherein said determining includes determining whether the superimposed signal portion used to communicate uplink channel assignment information to the wireless terminal was transmitted as a low power signal portion or a high power signal portion.

48. A device including a processor configured to control a wireless terminal to implement a method, the method comprising:

receiving a superimposed assignment signal including a first signal portion and a second signal portion one of said signal portions being intended for said wireless terminal with the other one of said signal portions being intended for another wireless terminal, the first signal portion being received with at a lower power level than said second signal portion;

decoding said first and second signal portions;

determining from information included in one of said first and second signal portions which portion is intended for said wireless terminal; and transmitting signals in uplink communications channel segments to which received superimposed assignment signals intended for said wireless terminal correspond.

49. The device of claim 48, wherein the method, further comprises:

storing received target level power information for a plurality of different received power target levels; and determining which one of the plurality of received target power levels to use when transmitting a signal in a particular uplink communications channel segment from a received superimposed assignment signal corresponding to the particular uplink communications channel segment.

50. The device of claim 49 wherein said determining includes determining whether the superimposed signal portion used to communicate uplink channel assignment information to the wireless terminal was transmitted as a low power signal portion or a high power signal portion.

* * * * *

UNITED STATES PATENT AND TRADEMARK OFFICE
CERTIFICATE OF CORRECTION

PATENT NO. : 7,411,895 B2
APPLICATION NO. : 10/782186
DATED : August 12, 2008
INVENTOR(S) : Rajiv Laroia, Junyi Li and Murari Srinivasan It is certified that error appears in the above-identified patent and that said Letters Patent is hereby corrected as shown below:

On Face page, in (57), Abstract, line 14 of Abstract, "on", should be --one--
On Page 33, column 33, Claim 23, line 11, "portion one", should read --portion, one--
On Page 34, column 35, Claim 34, line 50, "pro-selected", should be --pre-selected--
On Page 35, column 37, Claim 40, line 22, "portion one", should be --portion, one--
On Page 35, column 37, Claim 42, line 48, "portion one", should read --portion, one--
On Page 35, column 38, Claim 45, line 13, "portion one", should be --portion, one--
On Page 35, column 38, Claim 48, line 47, "portion one", should read --portion, one--

Signed and Sealed this

Eleventh Day of May, 2010

David J. Kappos
*Director of the United States Patent and Trademark Office*